(12) United States Patent
Fong et al.

(10) Patent No.: US 11,256,376 B2
(45) Date of Patent: Feb. 22, 2022

(54) ROTATABLE KNOB INTERFACE

(71) Applicant: SYNAPTICS INCORPORATED, San Jose, CA (US)

(72) Inventors: Kelvin Fong, San Jose, CA (US); Chun-Hsi Chen, Taipei (TW); Robert J. Bolender, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/142,655

(22) Filed: Jan. 6, 2021

(65) Prior Publication Data

US 2021/0232260 A1    Jul. 29, 2021

Related U.S. Application Data

(63) Continuation-in-part of application No. 16/750,934, filed on Jan. 23, 2020, now Pat. No. 10,921,913.

(51) Int. Cl.
*G06F 3/0362*    (2013.01)
*H01H 25/06*    (2006.01)
(Continued)

(52) U.S. Cl.
CPC .......... *G06F 3/0442* (2019.05); *G06F 3/0362* (2013.01); *G06F 3/0446* (2019.05);
(Continued)

(58) Field of Classification Search
CPC ... G06F 3/0362; G06F 3/0442; G06F 3/04166
See application file for complete search history.

(56) References Cited

U.S. PATENT DOCUMENTS 9,612,660 B2    4/2017    Drescher et al.
9,671,954 B1    6/2017    Jaugilas et al.
(Continued)

FOREIGN PATENT DOCUMENTS

| JP | 2016-218682 A | 12/2016 |
|---|---|---|
| KR | 10-1451183 B1 | 10/2014 |
| WO | WO 2019-073541 A1 | 4/2019 |

OTHER PUBLICATIONS

International Search Report dated Apr. 30, 2021 in International Patent Application No. PCT/US2021/014344.
(Continued)

*Primary Examiner* — Laurence J Lee
(74) *Attorney, Agent, or Firm* — Leydig, Voit & Mayer, Ltd.

(57) ABSTRACT

A sensing system is provided. A processing system drives a first subset of sensor electrodes with a sensing signal and receives corresponding resulting signals. The processing system also drives a second subset of the sensor electrodes with a reference signal and a third subset of the sensor electrodes with a guard signal. A rotatable electronic device includes a first coupling electrode and a second coupling electrode. The second coupling electrode couples with and receives the reference signal from the second subset of the sensor electrodes. The rotatable electronic device also includes a conductive region that rotates relative to the first coupling electrode and the second coupling electrode. The resulting signals are affected based on the position of the conductive region relative to the first coupling electrode when the first coupling electrode is coupled with the first subset of the sensor electrodes.

20 Claims, 22 Drawing Sheets

(51) Int. Cl.
  *G06F 3/044* (2006.01)
  *G06F 3/041* (2006.01)
  *G06F 3/0482* (2013.01)
  *G06F 3/0485* (2013.01)

(52) U.S. Cl.
  CPC ......... *G06F 3/04166* (2019.05); *H01H 25/06* (2013.01); *G06F 3/0482* (2013.01); *G06F 3/0485* (2013.01); *H01H 2239/006* (2013.01)

(56) References Cited

U.S. PATENT DOCUMENTS

| | | |
|---|---|---|
| 2018/0046267 A1 | 2/2018 | Kobayashi |
| 2018/0225022 A1 | 8/2018 | Choi et al. |
| 2020/0004345 A1 | 1/2020 | Ju et al. |
| 2020/0278761 A1 | 9/2020 | Takaoka et al. |
| 2021/0240305 A1* | 8/2021 | Takada .................. G06F 3/0416 |
| 2021/0286470 A1* | 9/2021 | Takada .................. G06F 3/0445 |

OTHER PUBLICATIONS

Written Opinion dated Apr. 30, 2021 in International Patent Application No. PCT/US2021/014344.
"Startup Wants to Put Real Knobs on your Tourhscreen", Synthtopia, Jun. 2014, www.synthtoipia.com.

* cited by examiner

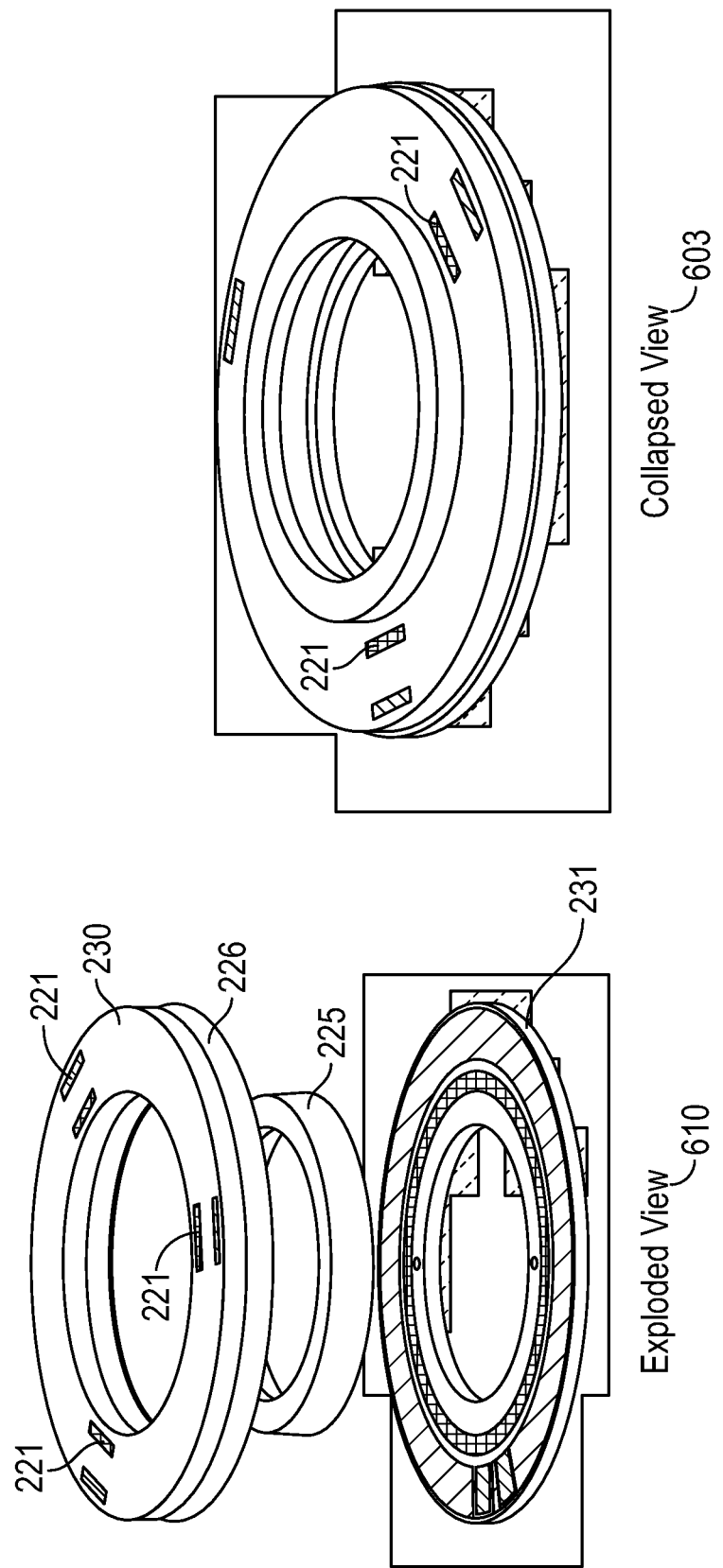

FIG. 15C

ROTATABLE KNOB INTERFACE

CROSS REFERENCE TO RELATED APPLICATIONS

This application is a continuation-in-part of the benefit of U.S. non-provisional patent application Ser. No. 16/750,934, filed Jan. 23, 2020, which is hereby incorporated herein by reference.

TECHNICAL FIELD

Embodiments of this disclosure relate to a rotatable knob interface.

BACKGROUND

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic systems. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones. Additionally, proximity sensor devices may be implemented as part of a multi-media entertainment system or an automobile. In such cases, it is useful to interface a knob to a proximity sensor device.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A rotatable electronic device is disclosed. In one embodiment, a rotatable electronic device includes a stationary base including a bottom surface and a top surface, the electronic device configured to attach to an input device. The bottom surface includes a first set of coupling electrodes configured to be aligned with, and receive a reference signal from, a first set of electrodes of the input device, and second and third sets of coupling electrodes respectively configured to be aligned with, and receive resulting signals from, corresponding second and third sets of electrodes of the input device. The top surface includes a top peripheral portion including first, second and third regions respectively connected to the first, second and third sets of coupling electrodes. The electronic device further includes a rotary wheel provided above the stationary base. The rotary wheel including a bottom peripheral portion provided with alternating conductive and non-conductive regions and configured to align with the top peripheral portion of the base. The resulting signal received at each of the second and third sets of coupling electrodes is modified by the relative positions of the stationary base and the rotary wheel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 6B illustrates the respective exploded and collapsed views shown in FIG. 6A, with the addition of the example rotary wheel of FIG. 3 provided on top of an example flat ring-shaped bearing.

FIG. 15C illustrates a third example placement of a rotatable knob interface above a sensor grid, according to one or more embodiments.

Figure 1:
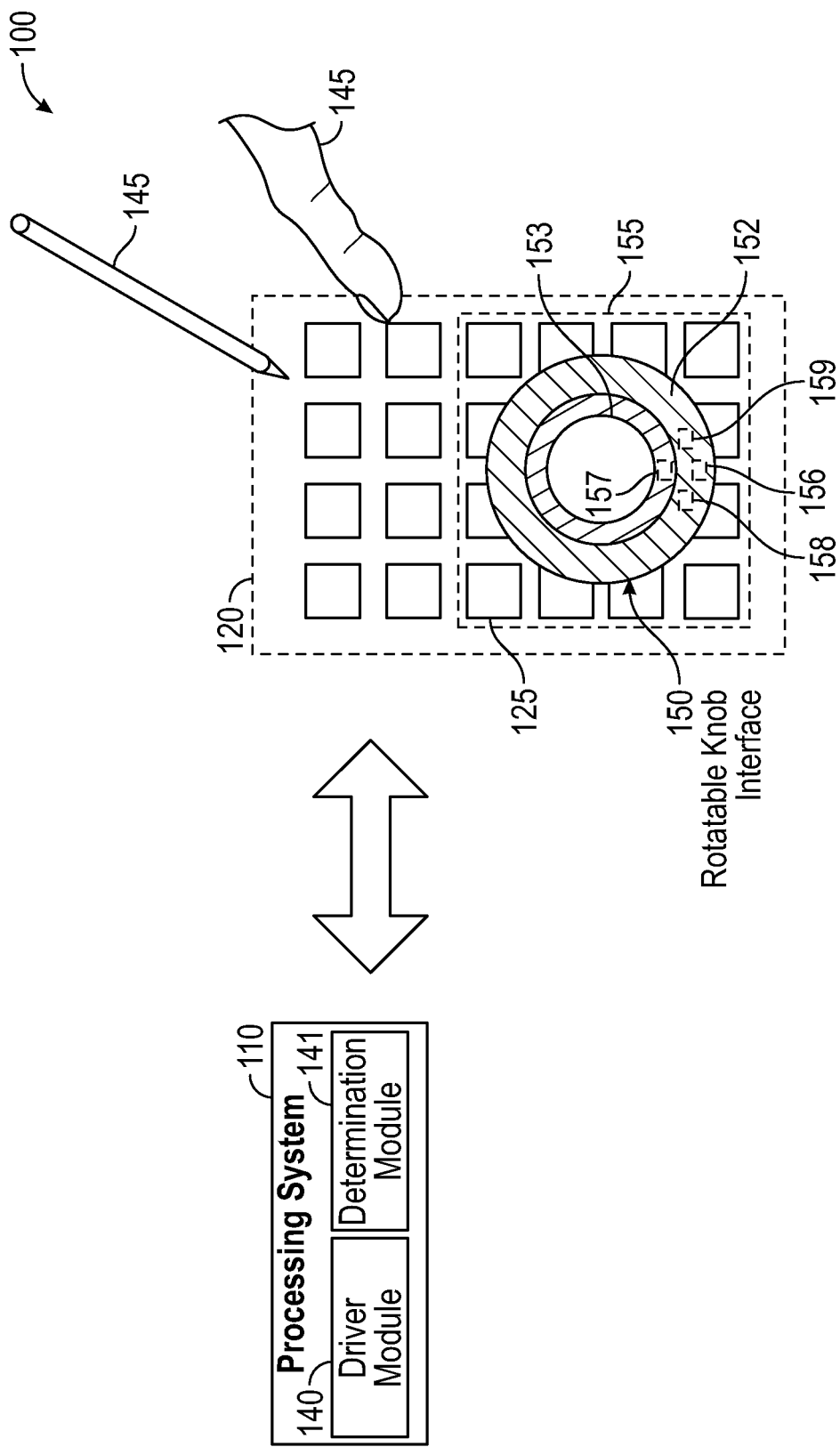
FIG. 1 illustrates an example input device with a rotatable knob interface, according to one or more embodiments.

To facilitate understanding, identical reference numerals have been used, where possible, to designate identical elements that are common to the Figures. It is contemplated that elements disclosed in one embodiment may be beneficially utilized on other embodiments without specific recitation. The drawings should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

The following description may use perspective-based descriptions such as top/bottom, in/out, over/under, and the like. Such descriptions are merely used to facilitate the discussion and are not intended to restrict the application of embodiments described herein to any particular orientation.

The following description may use the phrases "in one embodiment," or "in one or more embodiments," or "in some embodiments", which may each refer to one or more of the same or different embodiments. Furthermore, the terms "comprising," "including," "having," and the like, as used with respect to embodiments of the present disclosure, are synonymous.

The terms "coupled with," along with its derivatives, and "connected to" along with its derivatives, may be used herein, including in the claims. "Coupled" or "connected" may mean one or more of the following. "Coupled" or "connected" may mean that two or more elements are in direct physical or electrical contact. However, "coupled" or "connected" may also mean that two or more elements indirectly contact each other, but yet still cooperate or interact with each other, and may mean that one or more other elements are coupled or connected between the elements that are said to be coupled with or connected to each other. The term "directly coupled" or "directly connected" may mean that two or elements are in direct contact.

As used herein, including in the claims, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 is a block diagram of an exemplary electronic device 100 (e.g., an input device or system), in accordance with embodiments of the disclosure. The electronic device 100 may be configured to provide input to an electronic system (not shown), and/or to update one or more devices. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include the electronic device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device. Additionally, or alternatively, the electronics system may be part of an automobile, and the electronic device 100 represents one or more sensing devices of the automobile. For example, the electronic device 100 may be part of a multimedia entertainment system of an automobile. An automobile may include multiple electronic devices 100, where each electronic device 100 may be configured differently than the other.

The electronic device 100 can be implemented as a physical part of the electronic system, or can be physically separate from the electronic system. As appropriate, the electronic device 100 may communicate with parts of the electronic system using any one or more of the following: buses, networks, and other wired or wireless interconnections. Example communication protocols include Inter-Integrated Circuit (I²C), Serial Peripheral Interface (SPI), Personal System/2 (PS/2), Universal Serial Bus (USB), Bluetooth®, Radio Frequency (RF), and Infrared Data Association (IrDA) communication protocols.

The electronic device 100 may utilize any combination of sensor components and sensing technologies to detect user input. For example, as illustrated in FIG. 1, the electronic device 100 comprises one or more sensor electrodes 125 that may be driven to detect objects and/or update one or more devices. The sensor electrodes 125 may be part of a capacitive sensing device. Further, the sensor electrodes 125 may be part of an image sensing device, radar sensing device, or ultrasonic sensing device, among others. Further, the sensor electrodes 125 may be discrete sensor electrodes.

The electronic device 100 may include the display panel 120, and the sensor electrodes 125 may comprise display electrodes of the display panel 120. For example, the sensor electrodes 125 are comprised of the common voltage electrodes, data lines, or gate lines of the display panel 120. The sensor electrodes 125 may be operated for input sensing and for updating the display of the display panel 120. For example, the sensor electrodes 125 function as the reference voltage electrode of the display panel 120.

Some of the examples described herein include a matrix sensor input device. In such examples, as is illustrated in FIG. 1, the sensor electrodes 125 are disposed in a two dimensional array of rows and columns. Further, as described in detail below, electronic device 100 includes a rotatable knob interface 150 that interacts with one or more of the sensor electrodes 125.

The sensor electrodes 125 may have a similar size and shape. For example, as illustrated in FIG. 1, each of the sensor electrodes 125 is substantially rectangular in shape. In other embodiments, at least one sensor electrode 125 has a different shape and/or size than another at least one sensor electrode 125. For example, the sensor electrodes 125 may be diamond shaped, circular in shape, have interdigitated fingers to increase field coupling, and/or have floating cutouts inside to reduce stray capacitance to nearby electrical conductors. Further, the orientation of the sensor electrodes 125 may differ from that illustrated in FIG. 1.

The sensor electrodes 125 may be disposed in a common layer. For example, the sensor electrodes 125 are disposed on a common side of a substrate. The sensor electrodes 125 may be disposed on lens or encapsulation layer of the display panel 120, or a substrate attached to the display panel 120. Additionally, or alternatively, a first one or more of the sensor electrodes 125 is disposed in a first layer and a second one or more of the sensor electrodes 125 is disposed in a second layer. For example, a first one or more of the sensor electrodes 125 is disposed on a first side of a first substrate, and a second one or more of the sensor electrodes 125 is disposed on a second side of the first substrate. Further, a first one or more of the sensor electrodes 125 may be disposed on a first substrate, and a second one or more of the sensor electrodes 125 may be disposed on a second substrate.

Some capacitive implementations utilize "self-capacitance" (or "absolute capacitance") sensing methods based on changes in the capacitive coupling between sensor electrodes and one or more input objects. An input object near the sensor electrodes, such as, for example, input object 145 (e.g., a digit or stylus), alters the electric field near the sensor electrodes 125, thus changing the measured capacitive coupling. In one implementation, an absolute capacitance sensing method operates by modulating sensor electrodes 125 with respect to a reference voltage (e.g., system ground), and by detecting the capacitive coupling between the sensor electrodes and input objects. For example, a resulting signal is received from the modulated sensor electrode or electrodes 125. Modulating the sensor electrodes 125 with respect to a reference voltage includes driving the sensor electrodes 125 with a sensing signal. When operating the sensor electrodes 125 for absolute capacitive sensing, the sensing signal is referred to as an absolute capacitive sensing signal. The resulting signal comprises effect(s) corresponding to the absolute capacitive sensing signal, and/or to one or more sources of environmental interference (e.g., other electromagnetic signals). The absolute capacitive sensing signal has a varying voltage. Further, the absolute capacitive sensing signal is a periodic or aperiodic signal. The absolute capacitive sensing signal has a square waveform, trapezoidal waveform, sinusoidal waveform, or a sawtooth waveform, among others.

Some capacitive implementations utilize "mutual capacitance" (or "transcapacitance") sensing methods based on changes in the capacitive coupling between two or more of the sensor electrodes 125. An input object (e.g., the input object 145) near the sensor electrodes 125 alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. For example, the transmitter sensor electrodes are driven with a sensing signal. The sensing signal is referred to as a transcapacitive sensing signal. The transcapacitive sensing signal has a varying voltage. Further, the transcapacitive sensing signal is a periodic or aperiodic signal. The transcapacitive sensing signal has a square waveform, trapezoidal waveform, sinusoidal waveform, or a sawtooth waveform, among others.

Receiver sensor electrodes may be held substantially constant relative to the reference voltage, or modulated with reference to the transmitter sensor electrodes to facilitate receipt of resulting signals. A resulting signal may comprise effect(s) corresponding to one or more transcapacitive sensing signals, and/or to one or more sources of environmental interference (e.g., other electromagnetic signals). Sensor electrodes may be dedicated transmitters or receivers, or may be configured to both transmit and receive.

Capacitive sensing devices may be used for detecting presence and/or position of input objects (e.g., the input object 145) in proximity to and/or touching input sensing regions of an input device. Further, capacitive sensing devices may be used to sense features of an input object, such as a fingerprint. Still further, as in the example of FIG. 1, capacitive sensing devices may be provided with a rotatable knob interface 150 that is electrically coupled to the sensor electrodes 125. The sensor electrodes 125 may be configured to sense the rotary position of the rotatable knob interface 150. For example, the rotatable knob interface 150 may have a home position and a compressed position. The sensor electrodes 125 may be used to determine when the rotatable knob interface 150 is in the home position or the compressed position based on a change in capacitive coupling of one or more of sensor electrodes 125 with a coupling electrode of the rotatable knob interface 150.

Continuing with reference to FIG. 1, a processing system 110 is shown as part of the electronic device 100. The processing system 110 is configured to operate hardware of the electronic device 100.

The processing system 110 may also comprise electronically-readable instructions, such as firmware code, software code, and/or the like. Components composing the processing system 110 may be located together, such as, for example, near the sensor electrodes 125. Components of the processing system 110 may be physically separate from one or more components in proximity to the sensor electrodes 125 or one or more components elsewhere. For example, the electronic device 100 may be a peripheral coupled to a desktop computer, and the processing system 110 may comprise software configured to run on a central processing unit (CPU) of the desktop computer and one or more integrated circuits (ICs) (perhaps with associated firmware) separate from the CPU. As another example, the electronic device 100 may be physically integrated in a phone, and the processing system 110 may comprise circuits and firmware that are part of a main processor of the phone. Further yet, the processing system 110 may be implemented within an automobile, and the processing system 110 may comprise circuits and firmware that are part of one or more of the electronic control units (ECUs) of the automobile. The processing system 110 is dedicated to implementing the electronic device 100. The processing system 110 may also perform other functions, such as operating display screens, driving haptic actuators, etc.

As illustrated in FIG. 1, the processing system 110 comprises a sensor driver 140. The sensor driver 140 generates the sensing signals, and drives the sensor electrodes 125 with the sensing signals. Further, the sensor driver 140 may be configured to receive resulting signals from the sensor electrodes 125. The processing system 110 comprises parts of or all of one or more integrated circuits (ICs) and/or other circuitry components. The sensor driver 140 includes circuitry configured to generate the sensing signal, drive the sensor electrodes with the sensing signals, and/or receive resulting signals from the sensor electrodes 125. For example, the sensor driver 140 includes an oscillator, one or more current conveyers and/or a digital signal generator circuit. Further, the sensor driver 140 includes driver circuitry including one or more amplifiers configured to drive the sensor electrodes 125 with the sensing signals. The sensor driver 140 includes receiver circuitry including one or more analog front ends, filters, and demodulators to receive and process resulting signals.

The sensor driver 140 may simultaneously operate two or more of the sensor electrodes 125 for absolute capacitive sensing, such that a different resulting signal is simultaneously received from each of the sensor electrodes or a common resulting signal from two or more sensor electrodes. Additionally, or alternatively, some of the sensor electrodes 125 may be operated for absolute capacitive sensing during a first period and others of the sensor electrodes 125 are operated for absolute capacitive sensing during a second period that is non-overlapping with the first period.

As illustrated in FIG. 1, the processing system 110 includes the determination module 141. The determination module 141 comprises circuitry, firmware, software, or a combination thereof. As will be described in greater detail in the following, the determination module 141 processes the resulting signals received by the sensor driver 140 to determine changes in capacitive couplings of the sensor electrodes 125. For example, the determination module 141 is configured to determine changes in a capacitive coupling between each modulated sensor electrode and an input object, such as input objects 145, from the resulting signals.

Different combinations of drivers and modules may be used. For example, the processing system 110 may include one or more drivers that operate hardware such as display screens. Further, the processing system 110 may include data processing modules for processing data such as sensor signals and positional information, and/or reporting modules for reporting information.

The processing system 110 may be implemented as an integrated circuit (IC) chip, or as one or more IC chips. The processing system 110 may comprise a controller, or a portion of a controller, of the electronic device 100.

The processing system 110 may include a display driver (not shown) that is configured for updating a display of the display panel 120. In such an example, the processing system 110 may be referred to as including touch and display driver integration (TDDI) technology. The processing system 110 may be implemented as a TDDI IC chip, or a portion of a TDDI IC chip.

The processing system 110 responds to user input (or lack of user input) directly by causing one or more actions. Example actions include changing operation modes, as well as graphic user interface (GUI) actions such as cursor movement, selection, menu navigation, and other functions. The processing system 110 provides information about the input (or lack of input) to some part of the electronic device 100 (e.g., to a central processing system of the electronic system that is separate from the processing system 110, if such a separate central processing system exists). Some part of the electronic system processes information received from the processing system 110 to act on user input, such as to facilitate a full range of actions, including mode changing actions and GUI actions. Further, the processing system 110 is configured to identify one or more input objects 145, and/or a location of the input objects 145 within a sensing region of the electronic device 100. The processing system 110 is configured to identify one or more rotational changes of the rotatable knob interface 150, or one or more changes of state of the rotatable knob interface 150, or both, and map those changes to an input action.

The processing system 110 operates the sensor electrodes 125 to produce electrical signals (resulting signals) indicative of input (or lack of input) in a sensing region of the electronic device 100. The processing system 110 may perform any appropriate amount of processing on the electrical signals in producing the information provided to the electronic system. For example, the sensor driver 140 of the processing system 110 digitizes analog electrical signals obtained from sensor electrodes 125. As another example, the sensor driver 140 of the processing system 110 performs filtering or other signal conditioning. Further, the determination module 141 of the processing system 110 subtracts or otherwise accounts for a baseline, such that the information reflects a difference between the electrical signals and the baseline. The determination module 141 of the processing system 110 further determines positional information, recognizes inputs as commands, recognizes handwriting, recognizes fingerprint information, and/or distance to a target object, among others.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In embodiments where the sensor electrodes 125 are configured for display updating and capacitive sensing, the processing system 110 may be configured to generate a voltage signal to drive the sensor electrodes 125 during a display update interval during which the display of the display panel 120 is updated and a sensing signal to drive the sensor electrodes 125 during an input sensing interval, respectively. The voltage signal generated to drive the sensor electrodes 125 during a display update interval may be a substantially constant, or fixed voltage. The sensing signal generated to drive the sensor electrodes 125 during an input sensing interval may have a variable voltage. The value of a voltage signal to drive the sensor electrodes 125 during a display update interval may be predetermined. For example, the voltage value may be provided by a manufacturer of electronic device 100 and/or the sensor electrodes 125, and may be device-specific to electronic device 100. The processing system 110 may comprise circuitry to generate the voltage signal based on a clock signal, the output of the oscillator and/or the corresponding value of the voltage signal.

The display of the display panel 120 is updated during display frames. During each display frame, one or more display lines of the display may be updated. Multiple display update periods and non-display update periods may occur during each display frame of a plurality of display frames. During a display update period, one or more of the display electrodes of the display panel 120 may be driven to update the display of the display panel 120. During non-display update periods, one or more of the display electrodes of the display panel 120 may not be driven to update the display of the display panel 120. The non-display update periods may occur between pairs of display update periods of a display frame, at the start of a display frame, and/or at the end of a display frame.

The display panel 120 includes one or more display lines. Each display line corresponds to one or more subsets of the subpixels of the display panel 120. The one or more subsets may be connected to a common gate line of the display panel 120. Further, the subpixels may be updated during a common period. During each display update period, one or more display lines of the display panel 120 may be updated. The display frames may occur at a display frame rate. The display frame rate may be 30 Hz, 60 Hz, 120 Hz, or 240 Hz, among others. The sensor driver 140 or another driver of the processing system 110 may drive the display electrodes of the display panel 120 to update the display of the display panel.

The sensor driver 140 operates the sensor electrodes 125 for capacitive sensing during input sensing periods. The input sensing periods may occur during non-display update periods and/or display update periods. For example, one or more of the input sensing periods is provided during a non-display update period that occurs between two display update periods of a display frame. In one embodiment, at least one input sensing period is as long as a display update period. In one embodiment, at least one input sensing period is longer than a display update period. In yet another embodiment, at least one input sensing period is the same as a display update period.

Acquiring the resulting signals over successive input sensing periods allows the rotation of the rotatable knob interface 150, as well as whether the rotatable knob interface 150 is in the home state or the compressed state, to be tracked.

As noted above, an additional input apparatus may be provided on top of the display panel 120 of the electronic device 100, such as, for example, the rotatable knob interface 150, and may be electrically coupled to some or all of the sensor electrodes 125 that are positioned near or below it. The additional input apparatus may provide alternate ways for a user to provide input to electronic device 100 other than touching or hovering near, a display screen of the display panel 120 with an input object 145. In the depicted example of FIG. 1, the rotatable knob interface 150 is mounted onto the display panel 120, and may have a full (as shown in FIG. 1) or partial overlap with the display panel 120. As noted, the rotatable knob interface 150 may have a stationary base (not visible in the top view of FIG. 1) that is provided with various sets of coupling electrodes configured to couple with respective sets of sensor electrodes 125, such as one or more sets of the sensor electrodes 125 that are provided with sensing signals and one or more sets of electrodes that are provided with reference signals. The stationary base may include different conductive regions respectively connected to corresponding sets of coupling electrodes.

The rotatable knob interface 150 also includes a rotary wheel that sits above, and rotates relative to, the stationary base. An underside of the rotary wheel may be patterned with various conductive and non-conductive regions configured to align with the conductive regions of the stationary base. Accordingly, there are various electrical couplings between the conductive regions of the stationary base and the various conductive and non-conductive regions of the rotary wheel. These components are further configured such that these electrical couplings change as the rotary wheel is rotated. By detecting the effects of the changes in the electrical couplings by processing the resulting signals received on the display panel, the processing system 110 determines an amount of rotation, or an amount of change in rotation, of the rotatable knob interface 150. In one embodiment, the conductive and non-conductive regions are disposed within a peripheral region 152. In another embodiment, the various conductive and non-conductive regions may be part of one or more rings of the rotary wheel. A first ring may be referred as an outer ring and may be configured for rough (or coarse) tuning of the rotatable knob interface 150. A second ring may be referred to as an inner ring and may be configured for fine tuning of the rotatable knob interface 150. The first ring is disposed outside the second ring.

The peripheral region 152 may have numerous possible example arrangements of the conductive and non-conductive regions. Further, there may be various ways of having the rotary wheel and the stationary base electrically interact as the rotary wheel is rotated. Thus, alternate configurations and relative arrangements of both the conductive regions of the stationary base, and the placement of the conductive and non-conductive regions of the rotary wheel are possible, all being within the scope of this disclosure.

The rotation imparted to the rotatable knob interface 150 by a user, in either relative or absolute terms, may be detected by the electronic device 100. The rotatable knob interface 150 may also be pressed downwards by a user, and may thus have two or more positions, e.g., a home, or "uncompressed" position, and a "compressed" position. The "compressed" position may be maintained by, for example, pushing down on the rotatable knob interface 150 against one or more biasing springs. The rotatable knob interface 150 may have a cover. The rotatable knob interface 150 may be pressed downwards so as to rest at multiple positions, and thus may have multiple states between an "uncompressed" and a "fully compressed" position. In the home position the cover is at a greater distance above the rotary wheel than in the compressed position. The rotary wheel may have several switches provided between the rotary wheel and the cover. These switches may include the biasing springs. The rotatable knob interface 150 may be provided with one or more coupling electrodes 156 configured to couple to one or more of the sensor electrodes 125 of the input device that are also driven with sensing signals. In the example of FIG. 1, the coupling electrode 157 is connected to an inner ring provided in the stationary base, which aligns with a similarly shaped inner ring 153 that is provided in the rotary wheel. When a user presses down on the cover of the rotatable knob interface, so that the rotatable knob interface 150 is then in the "compressed" position, the switches close. For example, closing the switches may be defined as connecting the inner ring 153 of the rotary wheel with one or more of the conductive regions provided in peripheral region 152. This serves to electrically couple the coupling electrode 157 of the stationary base to coupling electrode 156 of the stationary base. The coupling electrode 156 is coupled with one or more sensor electrodes 125 that are driven with a reference signal. However, when the user ceases to press down on the cover, the coupling electrode 156 of the knob interface simply electrically floats. In various embodiments, direction and degree of rotation, as well as a user pressing down on, or ceasing to press down upon, the rotatable knob interface 150, may be interpreted by processing system 110, such as, for example, by determination module 141, and may be mapped to various user input actions, signals, or directives.

The rotatable knob interface 150 may be rotated in various ways. For example, the outer housing of the rotatable knob interface may be grabbed and turned, a top of the rotatable knob interface may be grabbed and turned, or a flange protruding from the side of the rotatable knob interface may be grabbed and turned. Further, one or more fingertips may be placed in on a recessed channel on an upper surface of the rotatable knob interface 150. Rotation of the rotatable knob interface 150 will be discussed in more detail in the following.

As is discussed above, the electronic device 100 of FIG. 1 may be provided in an automobile. For example, the display panel 120 may be vertically or horizontally oriented within a dashboard or center console of an automobile.

As illustrated in FIG. 1, one or more of the sensor electrodes 125 are not physically blocked by the rotatable knob interface 150. While performing capacitive sensing, the sensor electrodes 125 that are inside or are outside of a region defined by a boundary 155 (described below), can both remain active. Thus, both touches away from the rotatable knob interface 150, and rotations of the rotatable knob interface 150 can be detected and reported by the processing system 110 at the same time.

Alternatively, or additionally, all other forms of user input besides those received via the rotatable knob interface 150 may be disabled on the electronic device. For example, the sensor electrodes 125 outside of the boundary 155 are not driven during the sensing interval to perform capacitive sensing. As a result, if an input object 145 is moved into or away from the vicinity of rotatable knob interface 150, no resulting signal is obtained, or if obtained, is not processed. This function may be implemented as a safety measure, for example, to prevent a driver of an automobile from interacting with the display panel 120 while driving by allowing the driver to only interact with the electronic device 100 via the rotatable knob interface 150. The disabling of a capacitive sensing functionality of one or more the sensor electrodes 125 may be during specified activities of the automobile, but not during others. For example, the disabling of a capacitive sensing functionality of one or more of the sensor electrodes 125 may be activated while the automobile is in actual motion. In this example, some of the sensor electrodes 125, for example, those not within a specified proximity to the rotatable knob interface 150 to cause interference of the signals acquired from the rotatable knob interface 150, may be operated normally to perform capacitive sensing, as described above. In some embodiments, one or more of the sensor electrodes 125, for example those near or beneath the rotatable knob interface 150, are disabled from performing capacitive sensing, while the remainder of the sensor electrodes 125 are operated to perform capacitive sensing. In such embodiments, the disabled sensor electrodes 125 may be selected based on their potential interference to the resulting signals obtained from the sensor electrodes 125 electrically coupled to the coupling electrodes of the rotatable knob interface 150. As is illustrated in FIG. 1, the sensor electrodes 125 within the region (area) defined by the boundary 155 may be referred to as being in a "blackout zone." The sensor electrodes 125 within the blackout zone may not be operated to perform capacitive sensing during a period when the sensor electrodes 125 outside the region defined by the boundary 155 are operated normally to perform capacitive sensing. As will be described in greater detail in the following, one or more of the sensor electrodes 125 within the blackout zone and electrically coupled to the rotatable knob interface 150 are driven so as to capture rotations, compressions, and/or other motions of the rotatable knob interface 150.

In the embodiments where all of the sensor electrodes 125 are disabled from performing capacitive sensing, pre-defined parameters may be used to provide input to the electronic device 100 via the rotatable knob interface 150, for example, a pre-defined set of rotations and/or pressing positions of the rotatable knob interface 150. The resulting signals modified by the rotation and/or pressing motions may be received by the processing system 110 during an input sensing period, which then interprets the resulting signals, for example, using determination module 141. The resulting signals may be a modified version of sensing signal that the sensor driver 140 drives on the sensor electrode 125. For example, the resulting signals are modified by the capacitive coupling(s) of the rotatable knob interface 150.

In general, within the blackout zone (e.g., the region of sensor electrodes 125 defined by the boundary 155), one or more of the sensor electrodes 125 are coupled to respective coupling electrodes 156-159 of the stationary base of the rotatable knob interface 150. In some embodiments, the coupling electrode 156 is driven with a reference signal, and the coupling electrodes 157-159 are driven with a sensing signal. Accordingly, a resulting signal modified by the relative rotational relationship of the stationary base and the rotary wheel of the rotatable knob interface 150 is generated. The sensor electrodes within the blackout zone identified by the boundary 155 may be disabled from standard capacitive sensing at all times. For example, the sensor electrodes within the blackout zone may perform capacitive sensing specifically related to the rotatable knob interface 150, and the sensor electrodes outside the blackout zone may perform capacitive sensing to detect one or more input objects 145 during normal operations.

The coupling electrodes 156-159 are illustrated in phantom as the coupling electrodes 156-159 are occluded by the stationary base of the rotatable knob interface 150. Further, the position and/or orientation of the coupling electrodes 156-159 with regard to the stationary base of the rotatable knob interface 150 may vary from that illustrated in FIG. 1. For example, various embodiments related to the position and orientation of coupling electrodes of the rotatable knob interface 150 are described in greater detail with regard to FIGS. 4A-4C.

As used herein, the term "disabled electrode" may refer to an electrode that is not driven at all, an electrode that is driven with a guard signal, or one that is driven with a constant voltage signal (e.g., a direct current (DC) voltage).

Continuing with reference to FIG. 1, as noted above, sets of sensor electrodes 125 are electrically coupled to the coupling electrodes 156-159 of the rotatable knob interface 150. Thus, during an input sensing period a reference signal is supplied by the sensor driver 140 to a first set of the sensor electrodes 125, and a sensing signal is supplied to second and third sets of the sensor electrodes 125. The reference signal may be a configurable DC output provided by the processing system 110. The DC signal may be a ground signal of the electronic device 100. A resulting signal is obtained from each of the second and third sets of the sensor electrodes 125, where the resulting signals is the sensing signal as modified by the rotational state and/or compression state of the rotatable knob interface 150.

The resulting signals may be interpreted by the determination module 141 to determine a rotation of the rotatable knob interface 150. The rotation may be determined in relative terms, such as a differential angular change from a prior position, or in absolute terms, such as a positive or negative angular change from a home position. In embodiments where the rotatable knob is turned more than 360 degrees, the overall rotational distance may be measured. One or more user commands may be mapped to absolute rotational distance. The user commands may correspond to controlling a graphical user interface (GUI) of an input device. For example, the user commands may include scrolling through a list of menu items presented on by the GUI. In alternate embodiments, only the one or both of overall angular change between starting position and ending position, or final absolute angular position, is measured. For example, the determination module 141 determines a final absolute angular position which may be related to a menu item presented by a GUI of an input device.

Figure 2:
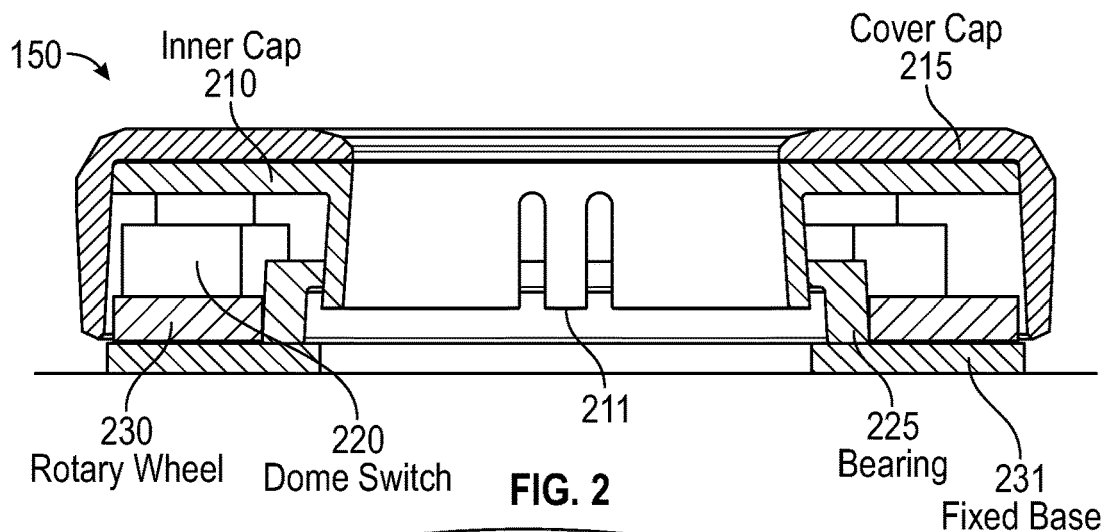
FIG. 2 illustrates a cross-sectional side view of an example rotatable knob interface, according to one or more embodiments.

FIG. 2 illustrates exemplary components of a rotatable knob interface (e.g., the rotatable knob interface 150 shown in FIG. 1), according to one or more embodiments. With reference thereto, starting at the bottom of the example device, there is shown a fixed base 231. The fixed base 231 does not move as the example knob interface is rotated. For example, the fixed base 231 may be affixed by, e.g., an adhesive, to a surface, e.g., a lens or encapsulation layer of the display panel 120 of electronic device 100. The fixed base 231 may be affixed in a temporary, semi-permanent or permanent manner, and may be placed thereon so as to align with a grid of the sensor electrode 125 provided in the electronic device 100.

Figure 3:
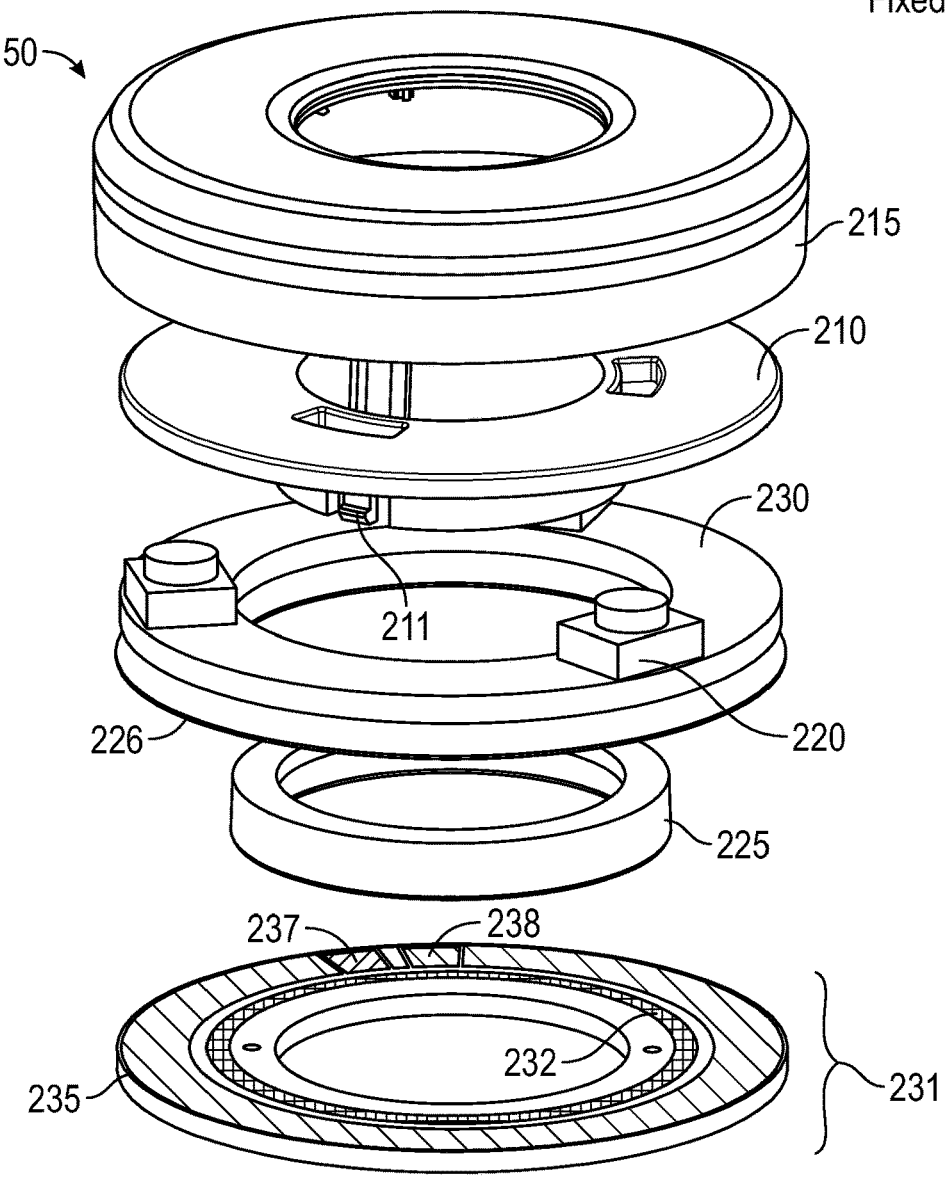
FIG. 3 illustrates an exploded view of the example rotatable knob interface of FIG. 2.

Provided above the fixed base 231 is a rotary wheel 230. The rotary wheel 230 turns as the rotatable knob interface 150 is rotated, for example, in response to the cover cap 215 being rotated, as is described below. At an inner side of the rotary wheel 230 is provided a vertical ring bearing 225. The vertical ring bearing 225 is non-conductive, and may be made of plastic or another non-conductive material, for example. An outer region of the vertical ring bearing 225 may have the shape of a ring. Further, the body of vertical ring bearing 225 may have a substantially tubular shape. Not shown in FIG. 2, but described below with reference to FIG. 3, is an additional substantially horizontal ring-shaped bearing upon which the rotary wheel 230 sits. By using both of the bearings, frictional forces between the fixed base 231, and the rotary wheel 230 may be reduced.

Continuing with reference to FIG. 2, provided on top of rotary wheel 230 are one or more switches 220. For example, switches 220 may be dome switches, capacitive switches, or the like. There may be three switches 220, and the switches may be equidistantly placed on an upper surface of rotary wheel 230. In other embodiments, less than or more than three switches may be utilized. As described more fully below, the switches 220 are used to distinguish between two states of the rotatable knob interface 150, namely a compressed state, in which the switches 220 are closed, and an uncompressed state, in which the switches 220 remain open. In other embodiments, the switches 220 may be used to distinguish more than two states of rotatable knob interface 150. For example, the switches 220 may be used to distinguish a compressed, uncompressed state, and one or more partially compressed states. In such embodiments, in the partially compressed states, the switches 220 are neither opened nor fully closed. Partially compressed, compressed, and open states may be determined based on corresponding measured changes in capacitive coupling caused by movement of a coupling electrode (e.g. the coupling electrode 157). In one embodiment, an open state may correspond to a measured change in capacitive coupling that corresponds to a lowest value, a closed state may correspond to a measured change in capacitive coupling that corresponds to a highest value, and a partially compressed state correspond to a measured change in capacitive coupling that corresponds to a value between the lowest value and the highest value. Multiple partially compressed states may be utilized. Each partially compressed state corresponds to a different measured change in capacitive coupling. In one embodiment, the determination module 141 compares the measured change in capacitive coupling to each of the values to determine the state of the rotatable knob interface 150. The compression state of the rotatable knob interface 150 is orthogonal to its internal rotational position. Thus, the rotatable knob interface 150 may be rotated while in either a compressed, a partially compressed, an uncompressed state (and in any position in between the states of the rotatable knob interface 150), and that rotation may be sensed and measured. Similarly, the state of the switches 220 corresponding respectively to the rotatable knob interface 150 being in the "home" or uncompressed state, in the compressed state, or in a partially compressed state, may be detected whether or not the rotatable knob interface 150 is rotationally stationary or being rotated.

Finally, continuing still with reference to FIG. 2, the rotatable knob interface 150 has an inner cap 210, and a cover cap 215, as shown. In operation, a user physically interacts with cover cap 215, for example, by grasping cover cap 215 and rotating the rotary wheel 230 relative to the fixed base 231, or by pushing down on the cover cap 215 to compress the knob interface and close the switches 220. As shown, the inner cap 210 is attached, by prongs 211, to a lip provided on the inner surface of vertical ring bearing 225. The cover cap 215 is attached to the inner cap 210, such that turning the outer cover cap 215 rotates the rotary wheel 230. In other embodiments, mechanisms other than the cover cap 215 and/or the inner cap 210 may be utilized to rotate the rotary wheel 230.

FIG. 3 illustrates an exploded view of the example rotatable knob interface 150 of FIG. 2, illustrating the upper side of various components. With reference to FIG. 3, beginning at the bottom of the figure, there is shown the upper surface of fixed base 231. The upper surface is provided with the peripheral ring 235, to be coupled to a reference signal of an input device (e.g., provided by the processing system 110 of the electronic device 100) to which the rotatable knob interface 150 is to be attached. As shown, the upper surface also shows an inner conducting ring 232 as well as two conductive pads 237 and 238. These three conductive regions are configured to receive a sensing signal from one or more of the sensor electrodes 125. Details of these regions, their functions, and how they interact with the input device (e.g., the electronic device 100) upon which the rotatable knob interface 150 sits, are described in greater detail below.

Continuing with reference to FIG. 3, there are also shown the vertical ring bearing 225, and a horizontal ring-shaped bearing 226, configured to slide over the vertical ring bearing 225. In one or more embodiments, because the fixed base 231 has a smaller inner diameter than the rotary wheel 230, there is a ledge at the inner periphery of the fixed base 231 upon which the vertical ring bearing 225 may sit. The vertical ring bearing 225 is thus configured to fit inside the inner diameter of the horizontal ring bearing 226, and rest upon the inner periphery of the fixed base 231. The two bearings thus provide a physical interface between the fixed base 231 and the rotary wheel 230, as noted above, which reduces friction between them as the rotary wheel 230 is moved.

Continuing further with reference to FIG. 3, there are also shown three switches 220 provided around the upper surface of rotary wheel 230. Above the switches 220 is shown the inner cap 210, which is configured to fit inside the vertical ring bearing 225, and be secured to the vertical ring bearing 225 by means of three prongs 211, which, in one or more embodiments are also placed equidistantly around the inner vertical surface of the vertical ring bearing 225. As shown, the inner cap 210 has a substantially horizontal upper ring, and a lower hollow cylindrical shaped portion. Thus, the outer diameter of the lower cylindrical shaped portion of the inner cap 210, may fit within an inner diameter of the vertical ring bearing 225, and then clamp to the bottom surface of the vertical ring bearing 225 by the prongs 211, which slightly protrude under such bottom surface when the inner cap 210 is in the home or uncompressed position. Finally, with reference to FIG. 3, the cover cap 215 is attached to the upper ring portion of the inner cap 210, as shown.

Figure 4A:
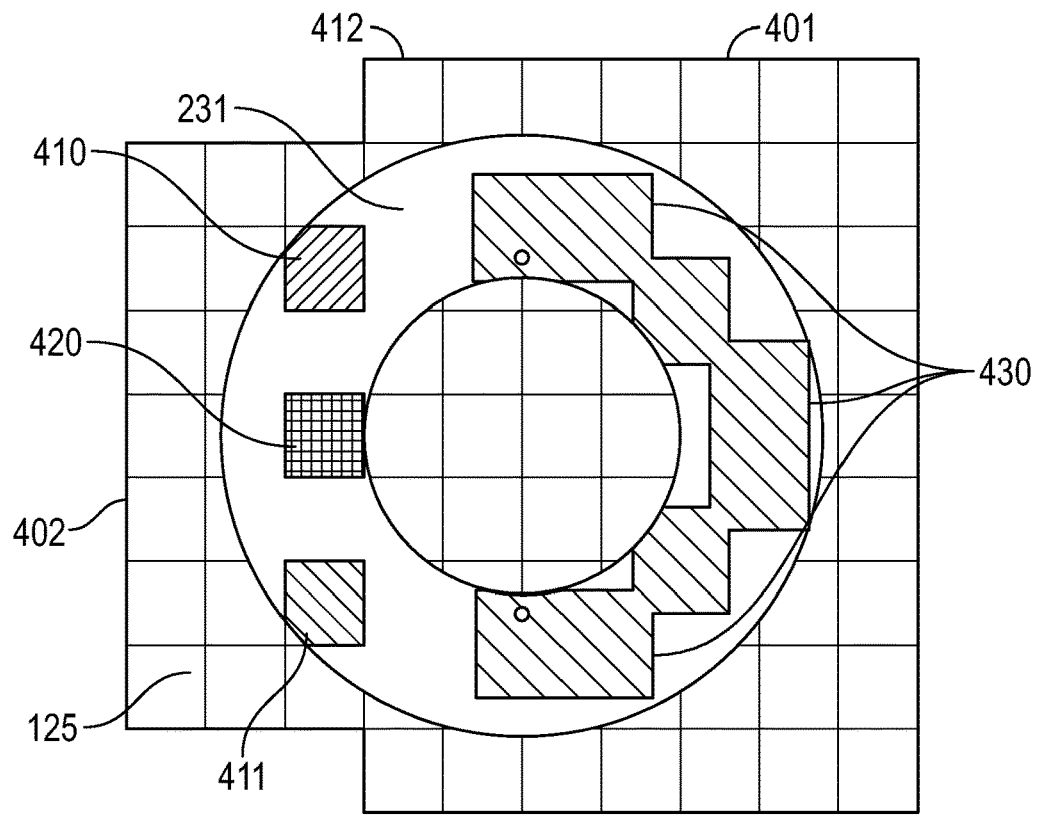
FIG. 4A illustrates an underside view of the fixed base of an example rotatable knob interface as shown in FIG. 3 with a first set of reference electrodes, and two sets of coupling electrodes according to one or more embodiments.
Figure 4B:
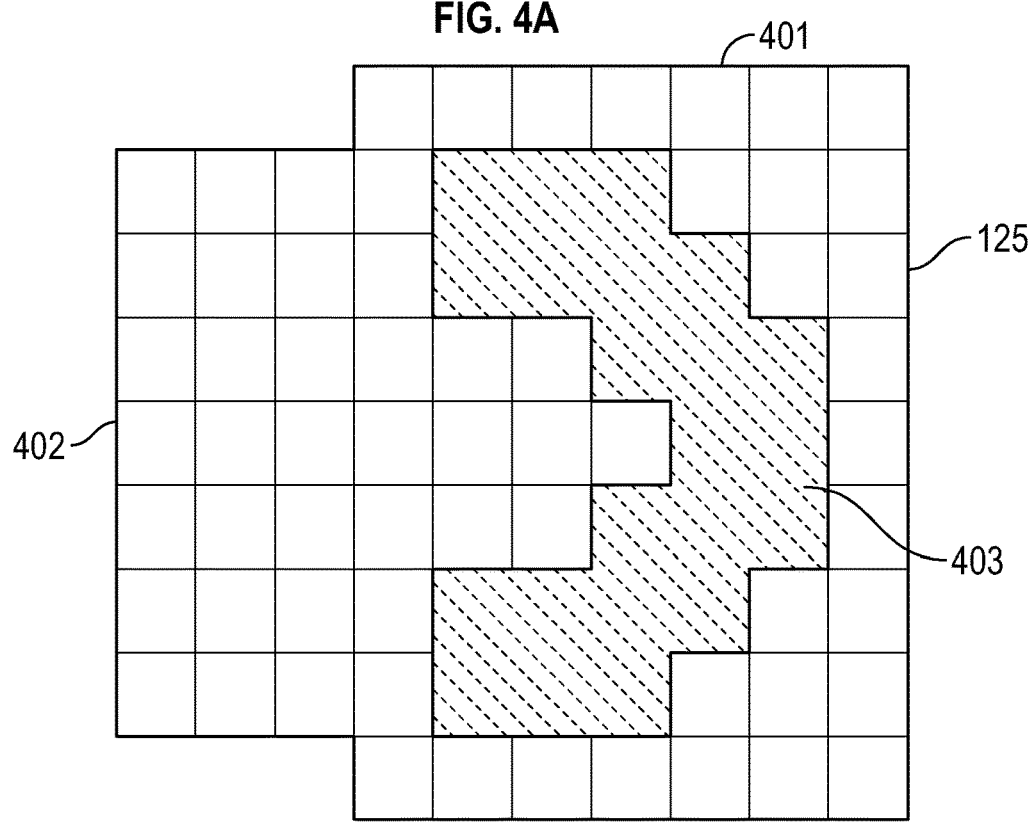
FIG. 4B illustrates an example portion of an input device illustrating a grid of sensor electrodes, the grid of sensor electrodes is configured into two sets of sensor electrodes, according to one or more embodiments.
Figure 4C:
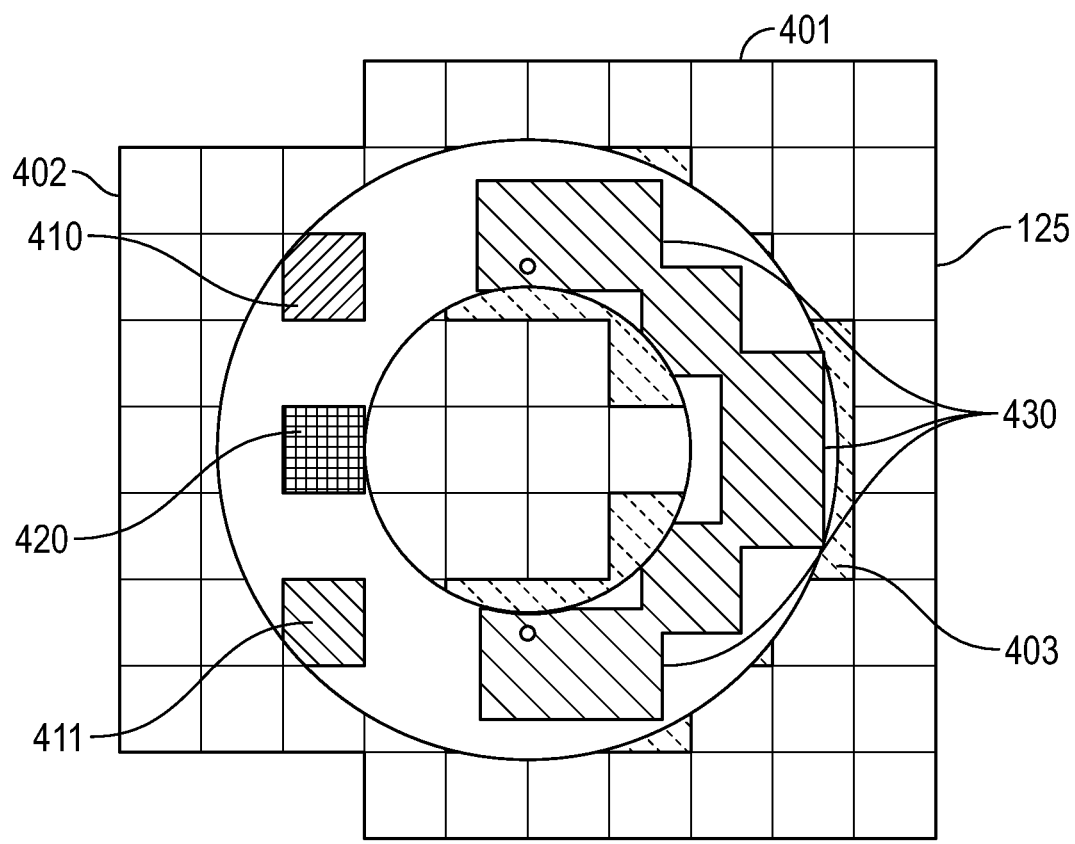
FIG. 4C illustrates the fixed base of an example rotatable knob interface of FIG. 4A as positioned over the example grid of sensor electrodes of FIG. 4B, according to one or more embodiments.

FIGS. 4A through 4C, next described, illustrate the spatial relationships between coupling electrodes provided on the bottom surface of the fixed base 231, respectively connected to corresponding conducting regions on the top surface of the fixed base 231, and the sensor electrodes 125.

FIG. 4A illustrates a view of the underside of the fixed base 231 of the rotatable knob interface 150, superimposed over a grid 401 of the sensor electrodes 125, according to one or more embodiments. The grid 401 may correspond to the blackout zone defined by the boundary 155 of FIG. 1. Further, in other embodiments, the grid 401 may correspond to other configurations of the sensor electrodes 125. With reference thereto, the bottom, or underside, of fixed base 231 has three sets of electrodes. A first set of electrodes 430, shown as shaded, is a contiguous set of electrodes configured to receive a reference signal from one or more of the sensor electrodes 125. Three coupling electrodes 410, 420, 411, grouped into the remaining two sets, are configured to receive a sensing signal from one or more of the sensor electrodes 125. The second set, including the coupling electrodes 410 and 411, is configured to sense rotation of the rotatable knob interface 150. The third set, including the coupling electrode 420, is configured to sense a "click" or the closing of the switches 220, for example, when the rotatable knob interface is placed in the compressed state. As shown, each of the coupling electrodes 410, 411 and 420 at least partially overlap one or more sensor electrodes 125 of the grid 401. On the other hand, the set of electrodes 430 may each overlap at least portions of multiple sensor electrodes 125 of grid 401, such that the set of electrodes 430 acquire a signal from the corresponding reference sensor electrodes of region 403 (see FIG. 4B) on the grid 401 on the upper surface of the example input device (e.g., the electronic device 100), and any effect of a parasitic capacitance from neighboring sensor electrodes 125 is mitigated. The sensor electrodes 125 of the region 402 exclude the sensor electrodes 125 of the region 403. For example, the sensor electrodes 125 of the region 402 include the sensor electrodes disposed proximate to the coupling electrodes 410, 411, and 420 and external to the sensor electrodes of the region 403. This isolation is illustrated in FIG. 4A by two features. First, there is an empty column 412 of sensor electrodes to the right of the coupling (or sensing) electrodes 410, 411 and 420 that provides a gap between the coupling electrodes 410, 411 and 420, and the set of electrodes 430. Second, the set of electrodes 430 (full line shading) are each recessed inwardly relative to the reference sensor electrodes of region 403 (shaded with dotted lines in FIG. 4B). The set of electrodes 430 may be recessed by about 1.5 mm to about 2 mm. However, in other embodiments, the set of electrodes 430 are recessed by less than about 1.5 mm or more than about 2 mm. This recessing may help the set of electrodes 430 sense the reference electrode signal and minimize sensing the parasitic coupling of nearby sensing signals on the sensor electrodes 125. Further, the recess also helps with tolerance alignment of the example rotatable knob interface 150 to the electronic device 100. In other embodiments, including the empty column 412 of sensor electrodes or recessing the electrodes 430 as is described above provides sufficient isolation of the set of electrodes 430 to mitigate the effects of the parasitic capacitance from neighboring sensor electrodes 125 on the set of electrodes 430.

FIG. 4B illustrates the sensor electrodes 125 of the grid 401 of FIG. 4A divided into two groups of the sensor electrodes 125, according to one or more embodiments. Each group of the sensor electrodes 125 may be driven with a different signal. For example, the sensor electrodes 125 in region 403 may be driven with a sensing signal while the sensor electrodes 125 in region 402 are driven by a reference signal. In general, each of the sensor electrodes 125 may be selectively driven with a sensing signal or a reference signal, such as, for example, ground, or other reference signal. To coordinate the sensor electrodes 125 of the grid 401 with the electrodes of the underside of a fixed base 231, as shown in FIG. 4A, the grid 401 of the sensor electrodes 125 is arranged as shown in FIG. 4B. Thus, the sensor electrodes 125 of the region 403 of the grid 401, shaded in FIG. 4B, may be driven with a reference signal, and sensor electrodes 125 outside the region 403 may be driven by with a sensing signal. Accordingly, there is an electrical pairing (e.g., electrical or capacitive coupling) between the underside of the fixed base 231, and the sensor electrodes 125 of the grid 401. This is illustrated in the superimposed view of FIG. 4C.

FIG. 4C thus illustrates the underside of fixed base 231 of FIG. 4A as positioned over the sensor electrodes 125 of the grid 401 of FIG. 4B, according to one or more embodiments. As shown, the coupling (or sensing) electrodes 410, 411 and 420, configured for sensing on the rotatable knob interface 150, are aligned with one or more of the sensor electrodes 125, such that the coupling electrodes 410, 411, and 420 are driven with a sensing signal via a capacitive coupling between the coupling electrodes 410, 411, and 420 and the one or more sensor electrodes 125. The coupling electrodes 410, 411, and 420 are driven with the same sensor electrodes 125. Similarly, the set of electrodes 430, configured for coupling to a reference signal of the processing system 110, are each provided above multiple sensor electrodes 125 of the region 403, to be driven with a reference signal by the processing system 110. Because the fixed base 231 is stationary, and fixed in position relative to the input device, the fixed based is first aligned to the sensor electrodes 125 of the input device, as shown, and then, in one or more embodiments, permanently attached to a surface of the electronic device 100.

Figure 5:
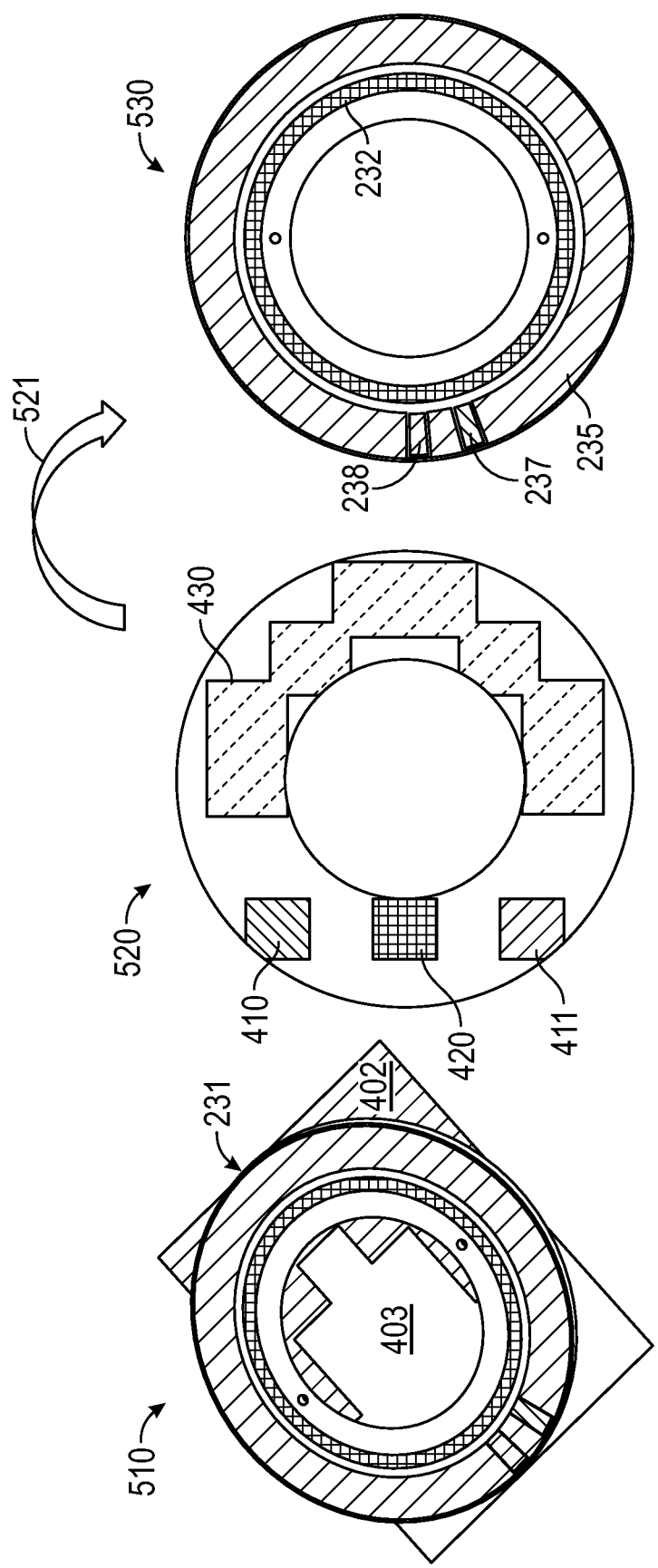
FIG. 5 illustrates a perspective top view, a bottom view and a top view of the example fixed base of FIGS. 3 and 4A through 4C, according to one or more embodiments.

Next described, with reference to FIG. 5, is the upper surface of the fixed base 231. With reference thereto, there is shown top perspective view 510, which illustrates the positions of electrode regions corresponding to the sensor electrodes 125 of the regions 402 and 403 relative to the top surface of the fixed base 231, according to one or more embodiments. As shown in the top perspective view, as well as by comparing bottom surface view 520 with top view 530, the top surface of the fixed base 231 is somewhat differently organized than its bottom surface. To fully appreciate the relative positions of conductive pads on the top and bottom surfaces, bottom surface view 520 is also shown, and, as indicated by the curved arrow 521, a corresponding position of the top surface is also shown, at top view 530. This top view 530 is what would be seen if the fixed base 231 as shown in bottom surface view 520 was flipped about a horizontal axis (such that right and left sides of the fixed base 231 are the same in views 520 and 530, respectively). Continuing with reference to FIG. 5, top view 530 illustrates four conductive regions, namely inner conductive ring 232 (used to sense whether the switches are open or closed), the two conductive pads 237 and 238 (used to sense rotation) and peripheral ring 235. Each of these is electrically connected by vias to a corresponding conductive region on the bottom surface of fixed base 231. In particular, peripheral ring 235 is electrically connected to corresponding set of electrodes 430, as noted above, to couple to the sensor electrodes 125 driven with a reference signal; the two conductive pads 237 and 238 are respectively connected to coupling electrodes 410 and 411; and inner conductive ring 232, is electrically connected to the coupling electrode 420. As is noted above, both conductive pads 237 and 238, as well as inner conductive ring 232 are configured to couple to the sensor electrodes 125 that are driven with a sensing signal.

Thus, in the embodiment shown, the top of fixed base 231 has, on its outer periphery, two small conductive pads 237 and 238 near each other, surrounded by a peripheral ring 235. The peripheral ring 235 receives a reference signal, and the two conductive pads 237 and 238 each receive a sensing signal. The two pads are used to sense rotation. A second, the inner conductive ring 232 inside of the peripheral ring 235 is configured to also receive a sensing signal to sense whether the switches are closed. The closing of the switches may also be referred to as a "click" from the sound they make when they close.

Figure 6A:
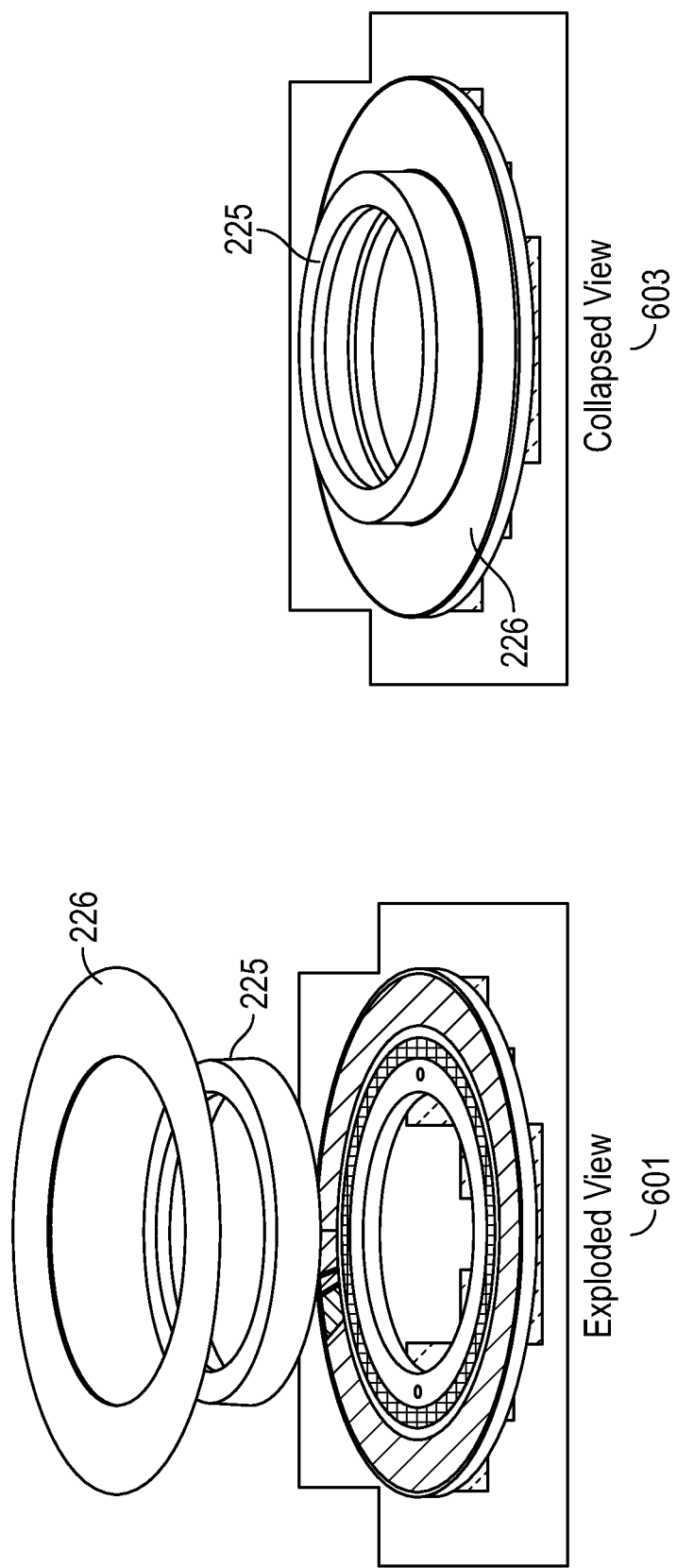
FIG. 6A illustrates exploded and collapsed views of the example fixed base and example plastic bearings shown in FIG. 3.

FIG. 6A illustrates exploded view 601 and collapsed view 603 of the example fixed base 231 and example vertical ring bearing 225 and horizontal ring bearing 226 (e.g., plastic bearing) shown in FIG. 3. As these elements have been previously described, they are not described again here. What is noted is, in one or more embodiments, as is shown in collapsed view 603, horizontal ring bearing 226 has a smooth surface on top of which the rotary wheel 230 can rest, and vertical ring bearing 225 has a smooth outer cylindrical structure around which the rotary wheel 230 can turn.

FIG. 6B illustrates the respective exploded view 610 and collapsed view 603 of the of the example fixed base 231, the vertical ring bearing 225, and the horizontal ring bearing 226 shown in FIG. 6A, with the addition of the example rotary wheel 230 of FIG. 3 provided on top of an example flat ring-shaped horizontal ring bearing 226. As shown, the vertical ring bearing 225 has a larger height than that of the rotary wheel 230, such that it protrudes above the rotary wheel 230. Visible in each of exploded view 610 and collapsed view 603, are three sets of pads 221 provided on a top surface of the rotary wheel 230 for connection to the set of switches (not shown). This is described in greater detail below, after the organization of the bottom surface of the rotary wheel 230 is described.

Figure 7A:
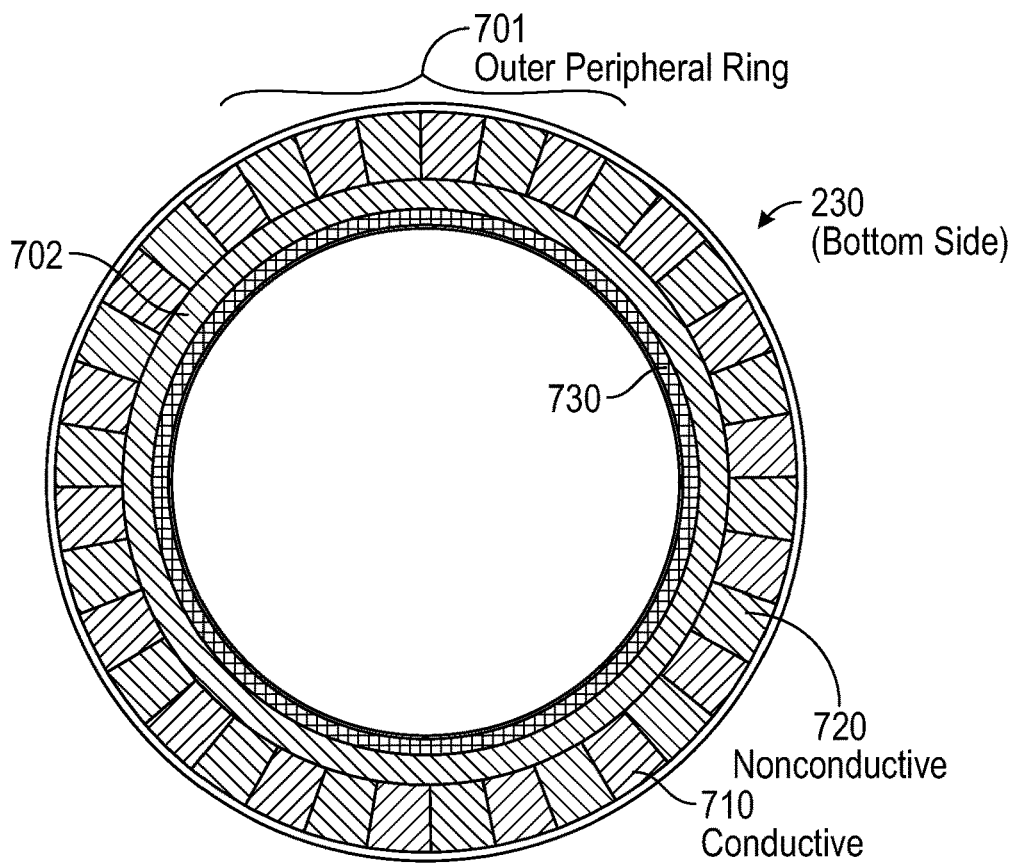
FIG. 7A illustrates a detailed bottom view of the rotary wheel of FIG. 3, according to one or more embodiments.

FIG. 7A illustrates a detailed bottom view of the rotary wheel 230 of FIG. 3. With reference thereto, as in the case of the top surface of the fixed base, there are essentially two ring shaped structures. An outer peripheral ring 701 which comprises alternating first conductive regions 710 and non-conductive regions 720, and an inner ring which comprises a single connected second inner ring (e.g., conductive region) 730, according to one or more embodiments. Additionally, the ring-shaped region (e.g., non-conductive divider ring 702), provided between the outer peripheral ring 701 and the inner ring 730, is also non-conductive. The first conductive regions 710 are used to sense rotation, and inner ring 730 is used to sense "click."

Figure 7B:
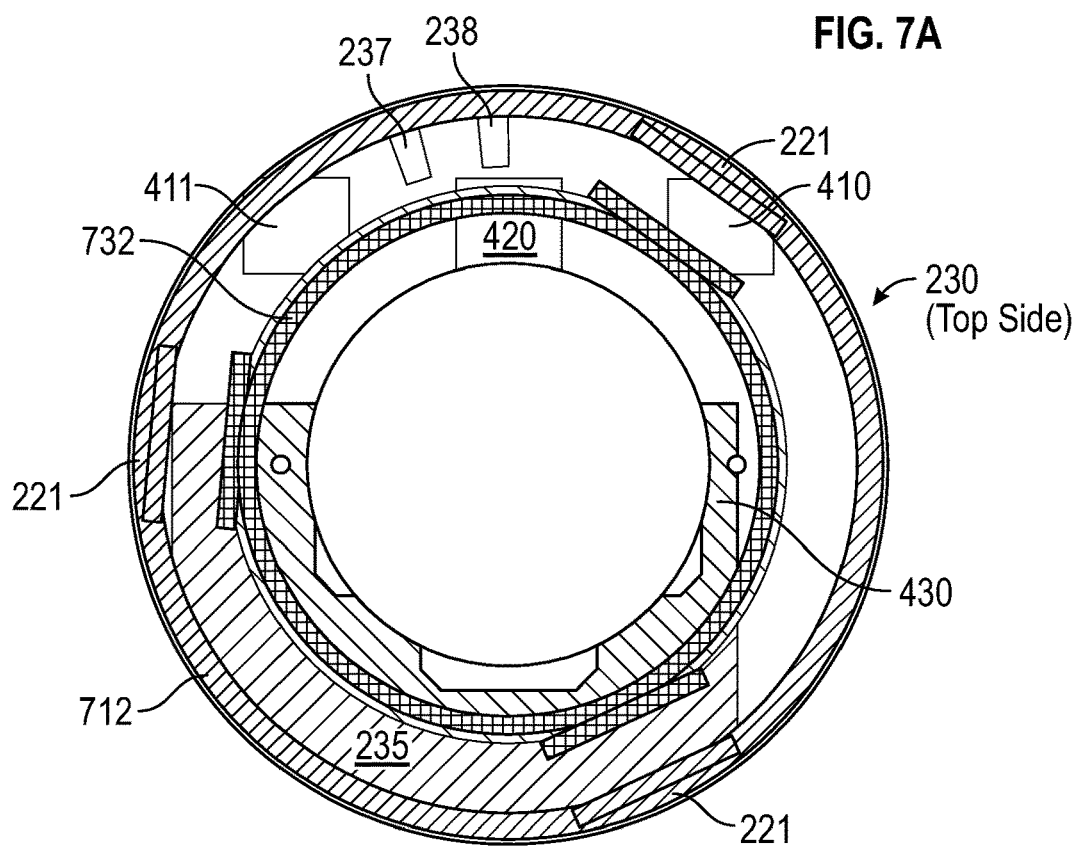
FIG. 7B illustrates a detailed top view of the rotary wheel of FIG. 7A, according to one or more embodiments.

FIG. 7B illustrates a detailed top view of the example rotary wheel of FIG. 3. The view of FIG. 7B corresponds to the view of the top surface of rotary wheel 230 shown in FIG. 6B that illustrates three sets of pads 221 which each respectively connect to a switch. The top view of FIG. 7B is drawn transparently, to show the underlying conducting rings to which each set of pads 221 is respectively coupled, as well as the other conductive regions on the bottom and top surfaces of the fixed base 231, previously described. These include, as shown here via the transparency, and as shown in FIG. 4A, on the bottom surface of the fixed base 231, the coupling electrodes 410, 420 and 411 and the set of electrodes 430 that is coupled to a reference signal of the processing system 110; and on the top surface of the fixed base 231, a portion of the peripheral ring 235, and the conductive pads 237 and 238.

The conductive regions 710 of FIG. 7A, as well as the conductive pads 237 and 238, and the peripheral ring 235 of FIG. 7B, may be made of known conductors, such as, for example, copper, silver, gold, aluminum, indium tin oxide, or other conductors, or, for example, various alloys of any of those, with each other, or with different elements or compounds. In one embodiment, the non-conductive regions 720 may be regions of a printed circuit board or substrate on which no metal is deposited, and thus be made of epoxy plastic and fiberglass, for example. In another embodiment, the non-conductive regions 720 may be formed by depositing an insulating layer such as a silicon dioxide ($SiO_2$) layer.

As shown in FIG. 7B, there are two ring shaped conductive regions, namely the outer ring region (e.g., the conducting ring 712) and the inner ring region 732, for example, provided just under the surface of the top side of the rotary wheel 230. The outer ring region (e.g., the conducting ring 712) is electrically connected to each of the first conductive regions 710 on the bottom side of the rotary wheel 230, as shown in FIG. 7A, by vias (not shown). Similarly, the inner ring region 732, provided on the inner periphery of the top side of the rotary wheel 230, is electrically connected to the second conductive inner ring region 730 on the bottom side of the rotary wheel 230, also shown in FIG. 7A, by vias (not shown). Additionally, in the depicted example of FIG. 7B, while the positions of the three sets of pads 221 to which the three switches 220 are to be connected are shown, the switches are not shown. Thus, when the switches 220 are closed, by a user pushing down on the cover cap 215 (shown in FIGS. 2 and 3) until the switches 220 make a clicking sound or another indication, the inner portion of each pad is electrically connected to the outer portion of each pad, which causes the regions corresponding to the conducting ring 712 and the inner ring region 732 to be electrically connected. This also may cause, with reference to FIG. 7A, the respective first conductive regions 710 to be connected to the inner ring region (e.g., a second conductive region) 732. It is noted that there may be more or less switches, and corresponding sets of switch pads to which they connect, in alternate embodiments. The pads 221 may be referred to as switch pads and maybe placed equidistantly around the rotary wheel 230, as shown. Additionally, or alternatively, the switches 220 may have more than two states, and thus have more positions than "compressed" or closed, and "uncompressed" or open." Further, the switches 220 may have one or more intermediate states between "compressed" and "uncompressed", and a user may push down on the cover cap 215 to move between an "uncompressed" or fully open state, and each of the intermediate states and the fully closed state. Each position of the switch 220 may be sensed, such as, for example, by signal strength of the electrical coupling at each state of the switch.

Figure 8:
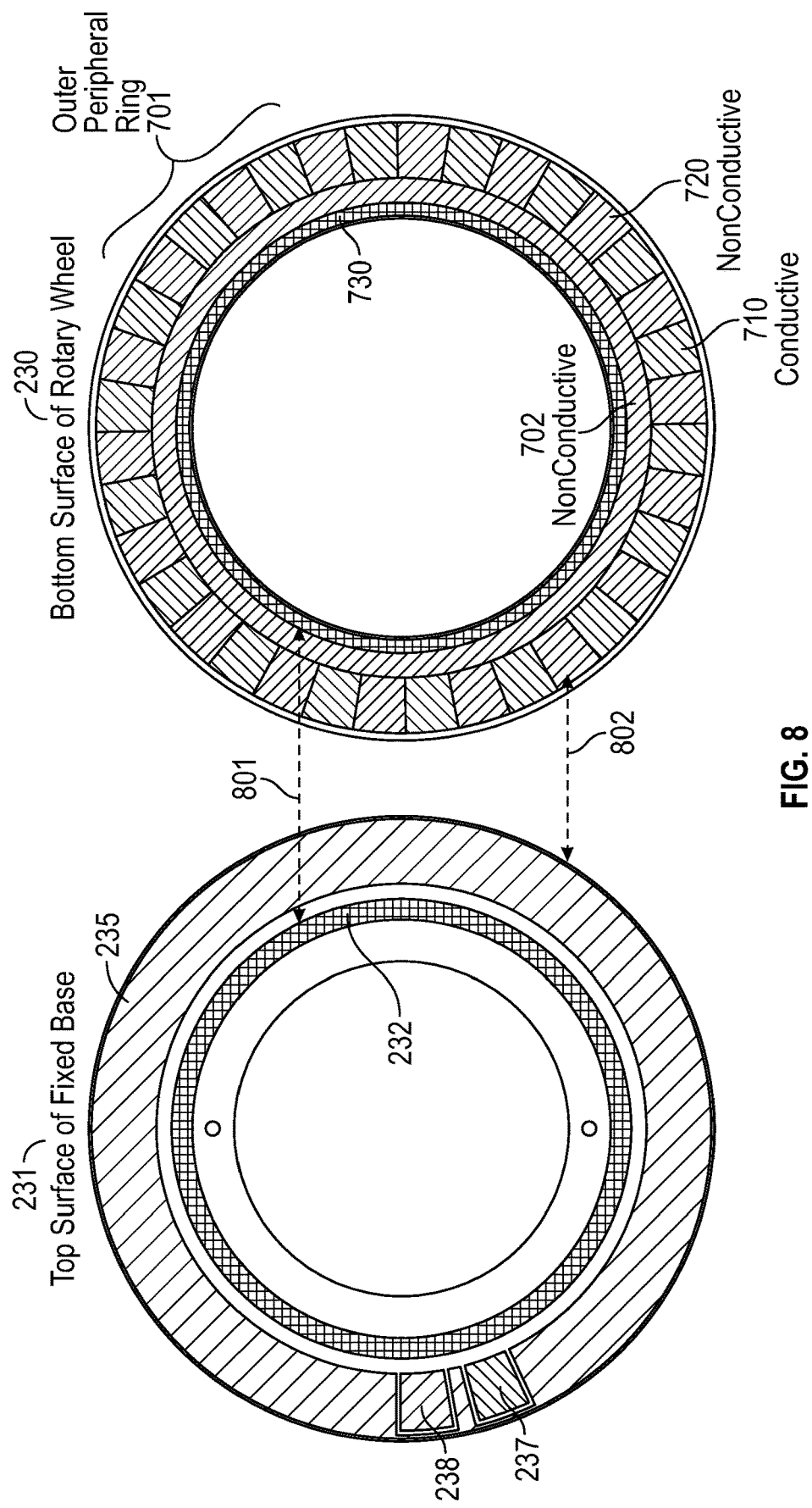
FIG. 8 depicts the top view of the example fixed base, and the bottom view of the example rotary wheel, as shown in FIGS. 5 and 7A, respectively, and capacitive coupling between them, according to one or more embodiments.

Given the descriptions above of the respective top and bottom surfaces of each of fixed base 231 and rotary wheel 230, the dashed arrows 801 and 802 of FIG. 8 illustrate the electrical coupling between the top surface of the fixed base 231 and the bottom surface of rotary wheel 230. The top surface of the fixed base 231 faces the bottom surface of the rotary wheel 230 in the assembled rotatable knob interface 150, when the rotary wheel 230 sits above the fixed base 231. With reference thereto, dashed arrow 801 depicts the electrical coupling between the inner conductive ring 232 of the top surface of the fixed base 231 and the inner ring 730 of the bottom surface of the example rotary wheel 230. Additionally, dashed arrow 802 depicts the electrical coupling between peripheral ring 235 of the top surface of the example fixed base 231, which includes conductive pads 237 and 238, and the various conductive regions 710 of the outer peripheral ring 701 of the bottom surface of the example rotary wheel 230. As noted above, the regions 720 of the outer peripheral ring 701 of the bottom surface of the rotary wheel 230 are non-conductive. Further, the non-conductive divider ring 702 is non-conductive, and is provided between the outer peripheral ring 701 and the inner ring 730.

As shown in FIG. 8, when the rotary wheel 230 sits above the fixed base 231 (with the horizontal bearing between them), there may be various electrical couplings between their respective peripheral ring regions. The peripheral ring 235 is coupled to a reference signal driven by the processing system 110 via the set of electrodes 430. Further, the peripheral ring 235 is capacitively coupled to one or more of the conductive regions 710 of the underside rotary wheel 230. Whether one or both of the conductive pads 237, 238 are coupled to the conductive regions 710 of the underside of the rotary wheel 230 depends upon the relative rotational position of the rotary wheel 230 and the fixed base 231.

To sense rotation, the two conductive pads 237 and 238 on the top surface of fixed base 231 are coupled to sensor electrode 125 that are respectively driven with sensing signals by the processing system 110. As noted above with reference to FIG. 4A, the conductive pads 237 and 238 on the top surface of fixed base 231 are respectively electrically connected by vias with the coupling electrodes 410 and 411 provided on the bottom surface of the fixed base 231. In turn, the coupling electrodes 410 and 411 are coupled to corresponding sensor electrodes 125 that are driven with sensing signals, as shown, for example, in FIG. 4C. By driving the sensor electrodes 125 that are respectively coupled to the coupling electrodes 410 and 411 with sensing signals, the resulting signals that are received by those sensor electrodes vary as a function of the capacitive coupling of each of the two conductive pads 237 and 238 on the top surface of fixed base 231 with the array of conductive region 710 and non-conductive regions 720 on the bottom surface of the rotary wheel 230.

Figure 9:
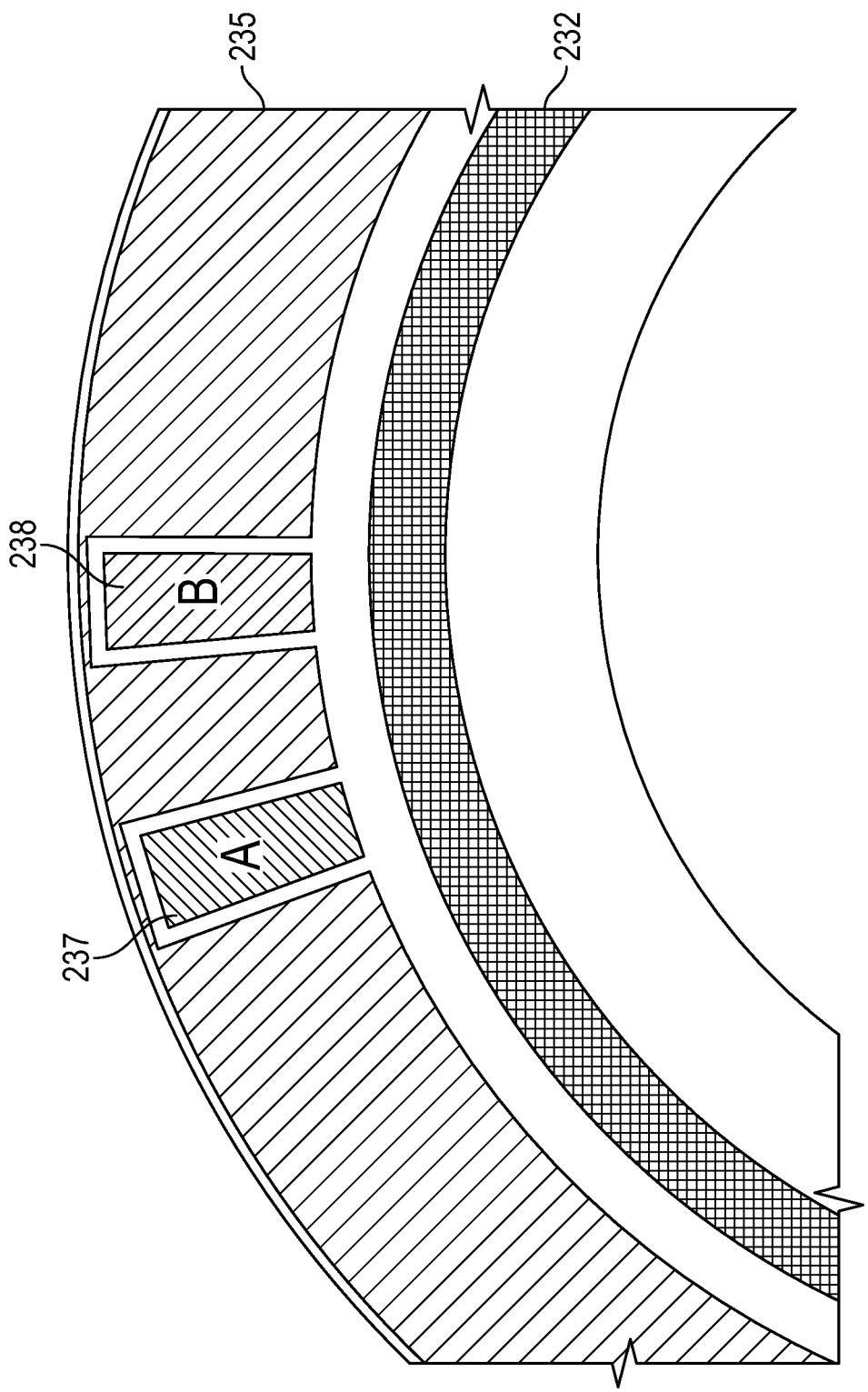
FIG. 9 illustrates example portion of the outer region conductive pads of the top of the fixed base, according to one or more embodiments.

FIG. 9 illustrates a small arcuate portion of the peripheral ring 235 of the top surface of the fixed base subtending perhaps at an angle of about 35 degrees. Additionally, or alternatively, angles of greater than or less than about 35 degrees may be utilized. The portion shown corresponds to the portion of image shown in FIG. 7B that includes conductive pads 237 and 238. To distinguish the signals coupled to each conductive pad, with reference to FIG. 9, the conductive pad 237 is assigned to channel A and the conductive pad 238 is assigned to channel B. For convenience, sometimes the conductive pad 237 may be referred to herein as the "channel A pad", and sometimes the conductive pad 238 may be referred to as the "channel B pad." By measuring resulting signals received by the sensor electrodes 125 that are respectively coupled to each of the conductive pads 237 and 238 at different points in time, the amount of rotation and/or the direction of the rotation between the two data points may be determined. Also shown in FIG. 9 is the peripheral ring 235 (which is coupled to the set of electrodes 430, and thus to the reference signal that drives them), and the region of the inner conductive ring 232 that is used to sense a state of the switches 220, as described in detail below.

Figure 10:
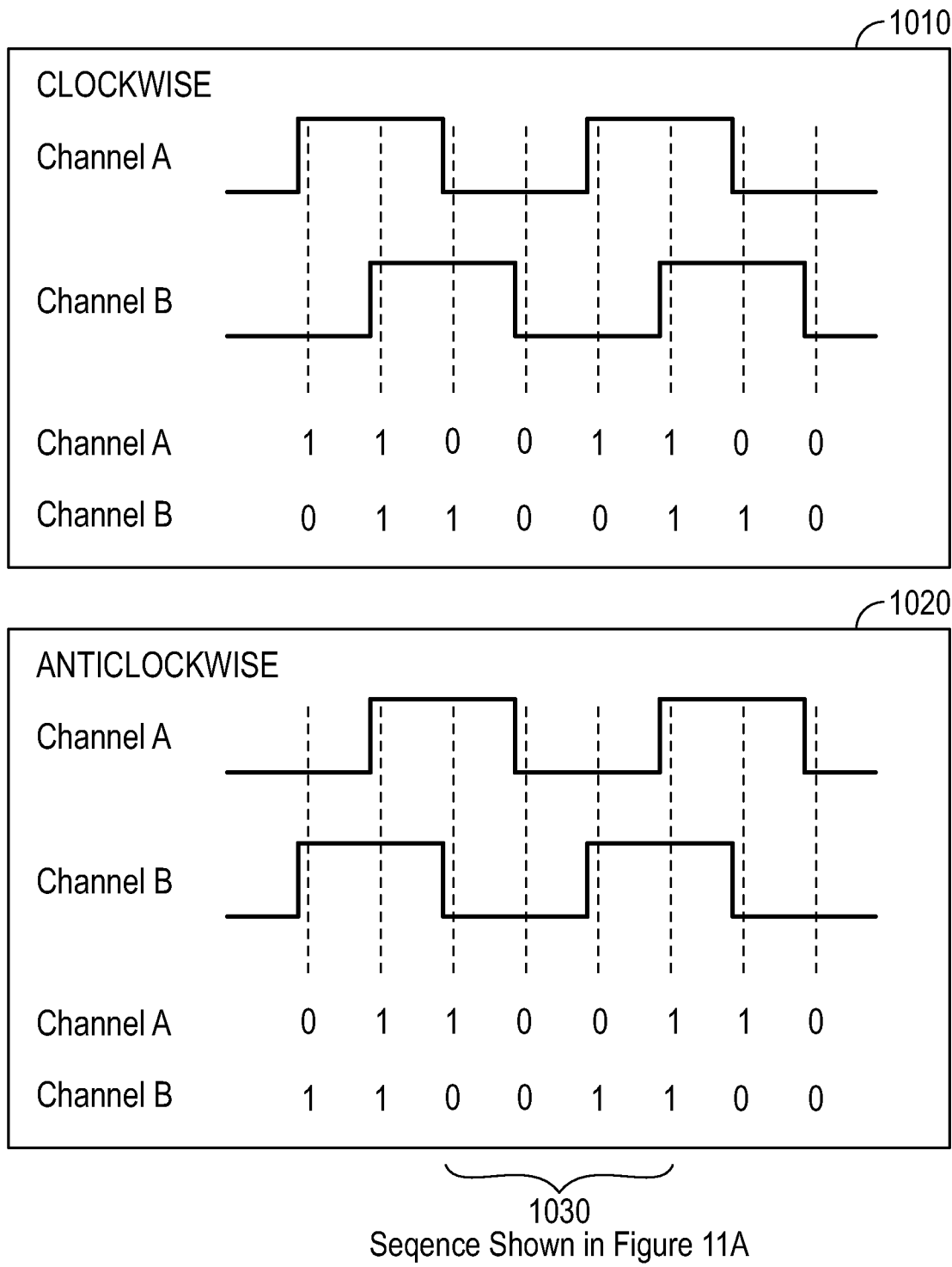
FIG. 10 illustrates example digitized quadrature encoder signals that may be generated by interaction of an example rotary wheel, according to one or more embodiments.
Figure 11A:
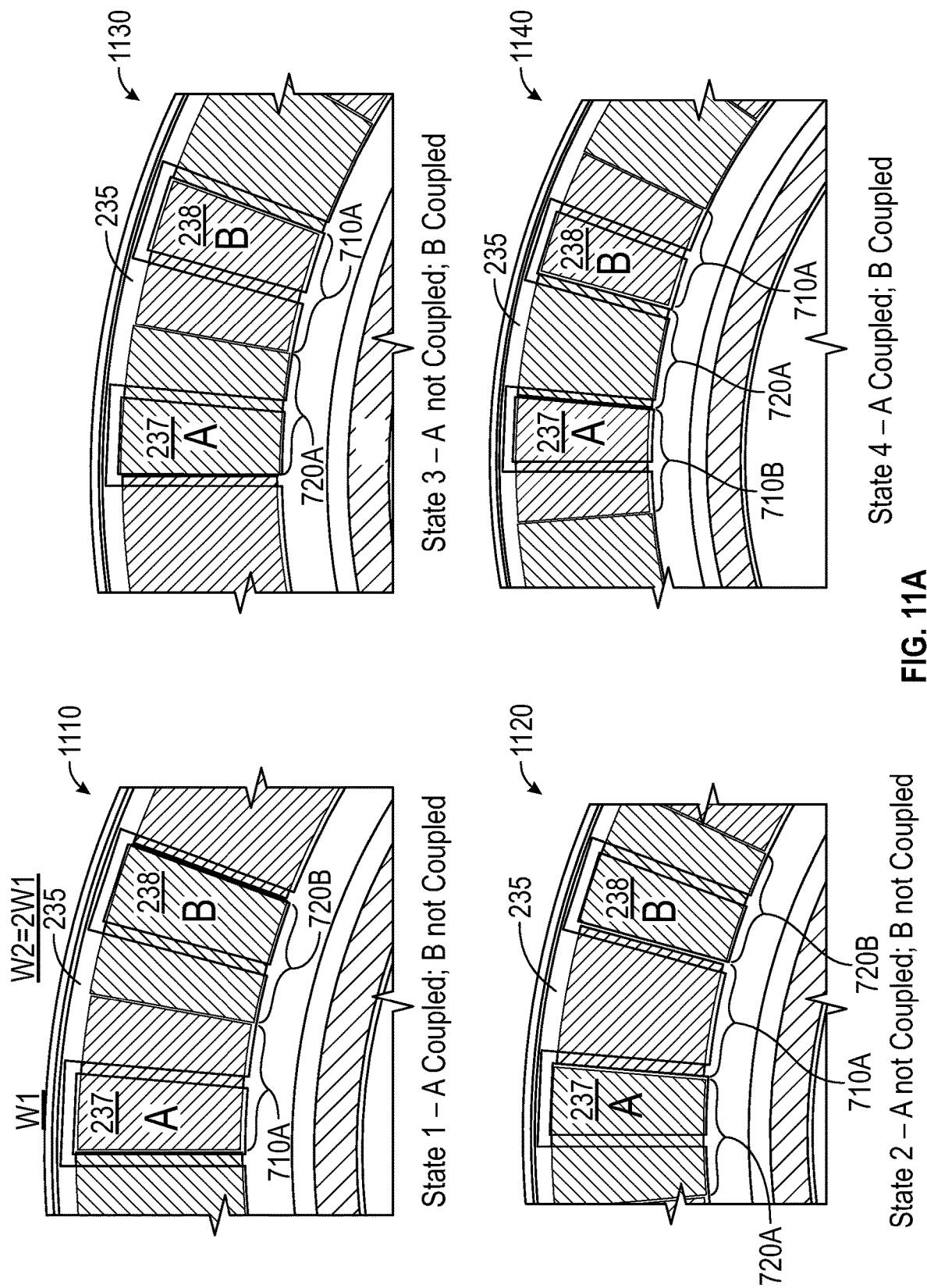
FIG. 11A illustrates four exemplary coupling states between the "A" and "B" designated conductive pads of an example rotary wheel, according to one or more embodiments.

FIG. 10 illustrates example digitized quadrature encoder signals that may be generated by the determination module 141 based on the interaction of the conductive pads 237 and 238 having the example channel assignments shown in FIG. 9, with the alternating conductive regions 710 and non-conductive regions 720 of the outer peripheral ring 701 on the bottom surface of rotary wheel 230 as is illustrated in FIG. 8, as the rotary wheel 230 is rotated by a user. The generated signals have one sequence for clockwise rotation 1010, and another sequence for anticlockwise rotation 1020. Relative rotation may be determined by the determination module 141 by comparing successive sequences. As shown, the respective signals used for channels A and B are identical in shape, but are shifted 90 degrees in phase. In other embodiments, the respective signals used for channels A and B may differ in shape in addition to, or alternatively to, being shifted by 90 degrees in phase. These signals may be better understood with reference to all of the possible overlap states between the conductive pads 237 and 238 of fixed base 231 with the underside pattern of rotary wheel 230, as is illustrated in FIG. 11A, next described. As next described, the four data points 1030 of the sequence of the anticlockwise rotation 1020, are shown in FIG. 11A.

FIG. 11A illustrates four possible coupling states, 1110 through 1140, of the "A" and "B" designated conductive pads 237 and 238 on the top of the fixed base 231 of FIG. 9, with the pattern of alternating conductive regions 710 and non-conductive regions 720 of the outer peripheral ring 701 on the bottom of the rotary wheel 230, according to one or more embodiments. In FIG. 11A, only a small portion of the peripheral ring 235 of the fixed base 231, near where the conductive pads 237 and 238 are provided, is shown. The relative positions of the conductive pads 237 and 238 to the underside of the rotary wheel 230 generate the illustrated signals of FIG. 10. FIG. 11A also shows a small portion of the peripheral ring 235 of the top of fixed base 231, as shown in FIG. 9 and described above, which surrounds the conductive pads 237 and 238. Each of the four states depicted in FIG. 11A has a corresponding data point in the encoder signals of FIG. 10, as next described. In FIG. 11A, the view is from under the top surface of the fixed base 231, looking upwards, with the conductive pads 237 and 238, and the peripheral ring 235 shown transparently, so that the alternating conductive regions 710 and non-conductive regions 720 are seen in the background. To distinguish the conductive regions 710 and the non-conductive regions 720, the conductive regions 710 are shaded using diagonal lines that run from top left to bottom right ("backslash"), and the non-conductive regions 720 are shaded with diagonal lines that run from bottom left to top right ("forward slash"), as shown.

In the depicted example of FIG. 11A the alternating conductive regions 710 and non-conductive regions 720 have the same shape and size. In other embodiments, the conductive regions 710 differs in size and/or shape from the conductive regions 720. It is also noted that in the depicted example of FIG. 11A, the conductive pads 237 and 238, corresponding to channels A and B, respectively, on the upper surface of fixed base 231 are sized such that the corresponding pad width W1 is one-half the width W2 of a conductive regions 710 or non-conductive regions 720 of the bottom of the rotary wheel 230. Accordingly, two of the conductive pads 237 or 238 fit within, or underneath, one conductive region 710 or non-conductive region 720. Further, conductive pads 237 and 238 may be separated from each other by two conductive pad widths W1, or one region (a conductive region 710 or a non-conductive region 720) width W2. In other embodiments, other orientations of the conductive pads 237 and 238 may be utilized. For example, the pad width W1 may be less than or greater than one-half the width of W2. Additionally, or alternatively, the conductive pads 237 and 238 may be separated from each other by less than or greater than two conductive pad widths W1 or one region width W2. The four states, as shown, indicate an anticlockwise rotation of the rotary wheel 230 relative to the fixed base 231. Accordingly, because, as noted, the view is from underneath the upper surface of the fixed base 231 looking into the bottom of the rotary wheel 230, it appears that the conductive pads 237 and 238, corresponding to channels A and B respectively, while in reality stationary, are moving anti-clockwise relative to the bottom of the rotary wheel 230.

Beginning with State 1 indicated by 1110, the conductive pad 237 (e.g., channel A) of the upper surface of the fixed base 231 is coupled to a conductive region 710A of the bottom surface of the rotary wheel 230. However, as the conductive pad 238 (e.g., channel B) is not coupled to the conductive region 710A as the conductive pad 238 is underneath a non-conductive region 720B of the bottom surface of the rotary wheel 230, as shown. Thus, in terms of the encoder signals of FIG. 10, which follow the convention that "coupled to a conductive region 710"=1, and "coupled to a non-conductive region 720"=0, the resulting signal corresponding to channel A has a value of 1 and the resulting signal corresponding to channel B has a value of 0, or an overall (A,B) value of (1,0). At State 2 indicated by 1120, a one pad width W1 turn (which is a one half of a conductive or non-conductive region width W2 turn) of the rotary wheel 230 to the right is indicated. As is illustrated in State 2 conductive pad 237 (e.g., the channel A) has been moved over to the left under a next non-conductive region (e.g., a non-conductive pad) 720A, and the conductive pad 238 (e.g., the channel B) is moved to be under the left side of non-conductive region (e.g., a non-conductive pad) 720B. In 1120, neither the conductive pad 237 nor the conductive pad 238 is coupled to a conductive region 710. Accordingly, the resulting signals of both channels A and B have a value of 0, or an overall (A,B) value of (0,0). The change from (A,B)=(1,0) to (0,0) is shown in FIG. 10 in the example signal set of the anticlockwise rotation 1020 as the third and fourth data points in the sequence. At State 3 indicated by 1130, the conductive pad 237 (e.g., the channel A) has been moved by a single W1 turn to the left to be under the left side of non-conductive region (e.g., a non-conductive pad) 720A, and thus the conductive pad 237 is not capacitively coupled to the conductive region 710. The conductive pad 238 (e.g., the channel A) has been moved one W1 turn to be underneath the right side of conductive region 710A, and is capacitively coupled to the conductive region 710. Thus, the resulting signal corresponding to the channel A has a value of 0 and the resulting signal corresponding to the channel B has a value of 1, for an overall value of (0,1). Finally, at State 4 indicated by 1140, the conductive pads 237 and 238 (e.g., the channels A and B, respectively) have moved another single W1 turn to the left, corresponding to the rotary wheel 230 above having turned another W1 turn to the right. Now both the conductive pad 237 and the pad 238 are capacitive coupled to conductive regions 710 of the underside of the rotary wheel 230. The conductive pad 237 has moved to the right side of conductive region 710B, and the conductive pad 238 has moved to the left side of conductive region 710A. Accordingly, both of the resulting signals corresponding to the channels A and B have values of 1, for an overall value of (A,B)=(1,1).

The determination module 141 may determine the progression of data points (A,B) through the four states of FIG. 11A is from (1,0) to (0,0) to (0,1) to (1,1). As shown at 1030 of FIG. 10, this sequence indicates an anticlockwise rotation. As noted above, it is here assumed that when the conductive pad 237 or 238 of the fixed base 231 is aligned with a conductive region 710 of the rotary wheel 230's underside, the corresponding resulting signal has a value=1, and when the conductive pad 237 or 238 is aligned with a non-conductive region 720 of the underside of rotary wheel 230, the corresponding resulting signal has a value=0. Alternatively, or additionally, the inverse convention may be used.

There is a relationship between the widths of the conductive pads 237 and 238 (which may have the same width, W1), and the widths of a conductive region 710 or non-conductive region 720 (which may have the same width, W2). The relative widths of W1 and W2 determine the resolution with which rotations of the rotary wheel 230 relative to the fixed base 231 may be detected. As shown in FIG. 11A, the width W1 of each of the conductive pads 237 and/or 238 is one half the width W2 of an underside conductive region 710 or non-conductive region 720. Thus, a change in rotation as a conductive pad 237 or 238 moves a W1 step may be detected. This is because in a W1 sized step the conductive pad 237 and/or 238 either moves from being under one side of a conductive region 710 or non-conductive region 720 to the other side of that region. For example, as is shown in FIG. 11A, the conductive pad 238 moves from one side of the non-conductive region 720B to the other side of the non-conductive region 720B between State 1 and State 2. Alternatively, in a W1 sized step, a conductive pad 237 or 238 moves from a second side of a conductive region 710 or non-conductive region 720 to a first side of an adjacent region of the other type, as shown, for example, in FIG. 11A. As is illustrated in FIG. 11A, the conductive pad 237 is indicated as moving from the second side of conductive region 710A to the first side of non-conductive region 720A.

Figure 11B:
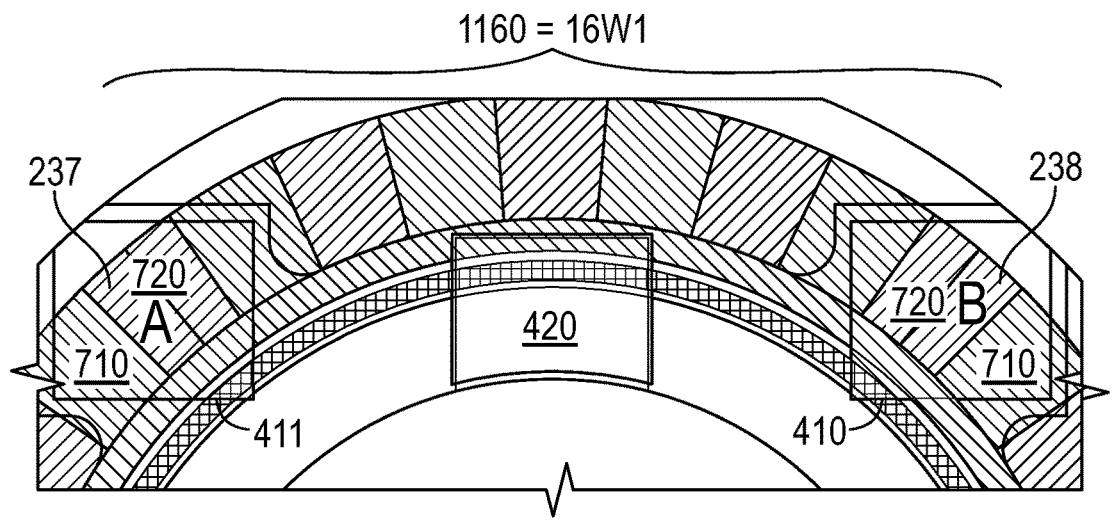
FIG. 11B illustrates an example distance between the two outer region conductive pads of an example rotary wheel, according to one or more embodiments.

FIG. 11B illustrates an example distance 1160 between the conductive pads 237 (e.g., channel A) and 238 (e.g., channel B) of the fixed base 231 in terms of the W1 conductive pad width. The point of view in FIG. 11B is from underneath the entire fixed base 231, looking upwards into essentially FIGS. 4C and 5. The three coupling electrodes 411, 410 and 420 of the bottom surface of the fixed base, and the two conductive pads 237 and 238 on the top surface of the fixed base are all shown in transparent mode. As shown, there are sixteen conductive pad width W1 divisions between conductive pads 237 and 238. There are seven conductive/non-conductive regions 710, 720 between conductive pads 237 and B 238 of width W2 each. Further, there are two additional W1 width regions, one to the right of the conductive pad 237 and the other to the left of the conductive pad 238. The conductive pads 237 and 238 are positioned above their corresponding coupling electrodes 411 and 410, respectively, on the underside of the fixed base. The distancing of the conductive pads 237 and 238 by a distance equal to 16W1 is so as to at least partially reduce parasitic coupling from other neighboring sensing pixels. Additionally, or alternatively, the distance between the conductive pads 237 and 238 is greater than or less than 16W1. In some embodiments, because the coupling electrodes 411 and 410 have a specific location in alignment to the sensor electrodes 125 of grid 401, as shown in FIG. 4C and described above, the position of the conductive pads 237 and 238 may be restricted to certain areas within the rotatable knob interface 150. In the example configuration of FIG. 11B, neither of the two conductive pads 237 and 238 are coupled to a conductive region of the underside of the rotary wheel 230. As shown, both of the two conductive pads 237 and 238 are coupled to non-conductive regions 720. However, one turn to the right would move the conductive pad 238, corresponding to the B channel, to a position where the conductive pad 238 couples to a conductive region 710. Alternatively, one turn to the left would move the conductive pad 237, corresponding to the A channel, to a position where the conductive pad 237 couples to a conductive region 710.

Figure 12A:
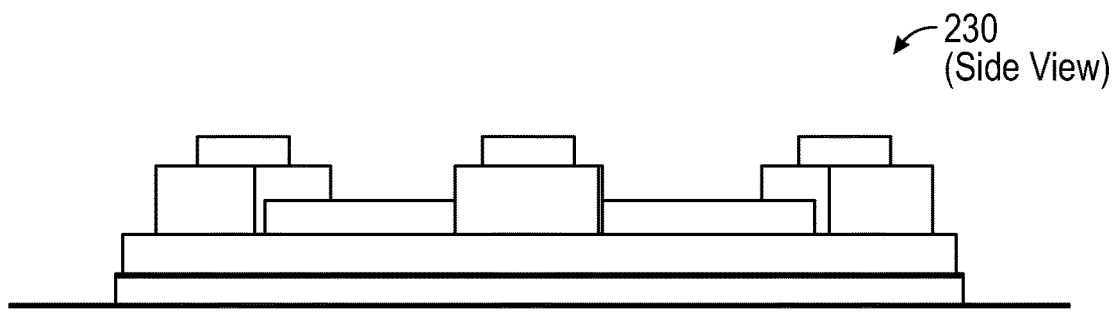
FIG. 12A is a side view of an example rotary wheel, illustrating three example switches provided on its upper surface and equidistantly spaced, according to one or more embodiments.
Figure 12B:
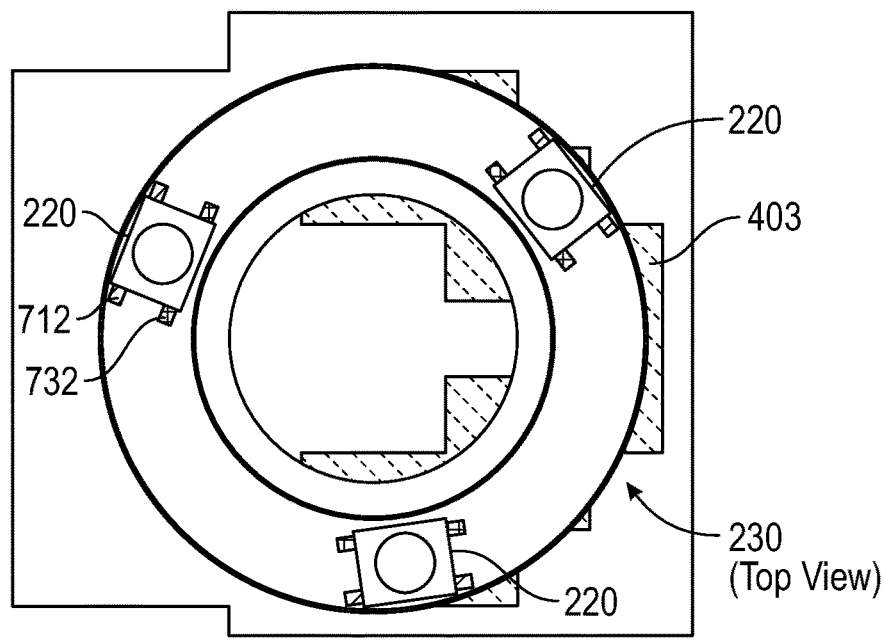
FIG. 12B is a top view of the example rotary wheel of FIG. 12A, illustrating the three example switches as provided above the example sensor grid of an example input device as shown in FIG. 4B, according to one or more embodiments.

Next described is the click, or mechanical response functionality, of pushing the switches 220 closed, and how the closing of the switches 220 is detected in one or more embodiments. FIG. 12A is a side view of the rotary wheel 230, illustrating three example switches 220 provided on its upper surface and equidistantly spaced, according to one or more embodiments. In other embodiments, more than three switches 220 or less than three switches 220 may be utilized. The switches 220 may be dome switches. In other embodiments, other types of switches 220 may be utilized. Similarly, FIG. 12B is a top view of the rotary wheel 230 of FIG. 12A, illustrating the three example switches 220 disposed above the example grid of sensor electrodes (e.g., the sensor electrodes 125) of an example input device (e.g., the electronic device 100) as shown in FIG. 4B. When the switches 220 are closed, the conducting ring 712 and the inner ring region 732, as shown in FIG. 7B, are electrically connected, which may be sensed by the processing system 110. As noted above, rotation of the rotatable knob interface 150 by a user and pushing down on the knob interface so as to close the switches 220 are orthogonal acts, and may not interfere with one another. In one or more embodiments, whether or not the switches 220 are closed does not affect the relative rotation of the fixed base 231 and the rotary wheel 230, or the ability of a user to further rotate rotatable knob interface 150.

Figure 13A:
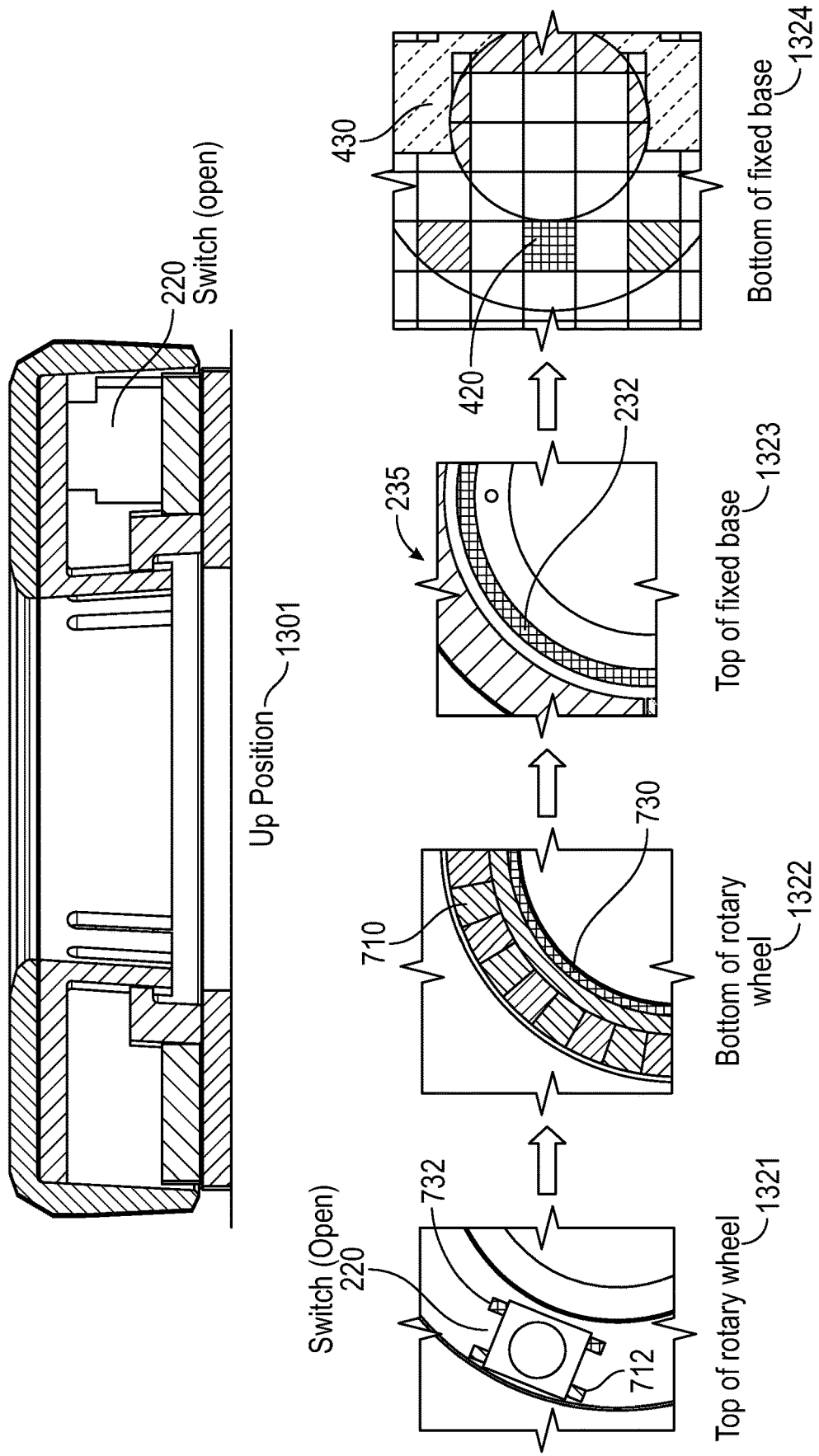
FIG. 13A illustrates a cut-away view illustrating the up position of the example rotatable knob interface of FIGS. 2 and 3, where switches are open, according to one or more embodiments.

As noted above, a user may close the switches 220 by pushing down on the outer cover cap 215 of FIG. 3. FIG. 13A illustrates a cut-away view illustrating the up position 1301 of the rotatable knob interface 150 of FIGS. 2 and 3, where switches 220 are open, according to one or more embodiments. FIG. 13A also shows the states of each of the upper and lower surfaces of each of the rotary wheel 230 and the fixed base 231 when the switches 220 are in an open state. As shown in FIG. 13A, drawing 1321 illustrates the top surface of the rotary wheel 230. Here, when the switch 220 is open, as indicated, there is no connection between the conducting ring 712 and the inner ring region 732, described above that are provided near the upper surface of the rotary wheel. As a result, corresponding conductive region 710 and inner ring 730 on the bottom surface of the rotary wheel 230, as shown at drawing 1322, may also be electrically isolated from one another. Thus, as a further result, on the top surface of the fixed base 231, as shown at drawing 1323, inner conducting ring 232 may remain isolated from peripheral ring 235, which is coupled to a reference signal via the set of electrodes 430 on the underside of the fixed base 231, and thus, on the bottom of fixed base 231, as shown in drawing 1324, the coupling electrode 420 (driven by a sensing signal) and the set of electrodes 430 (driven by a reference signal) remain electrically isolated form one another.

Figure 13B:
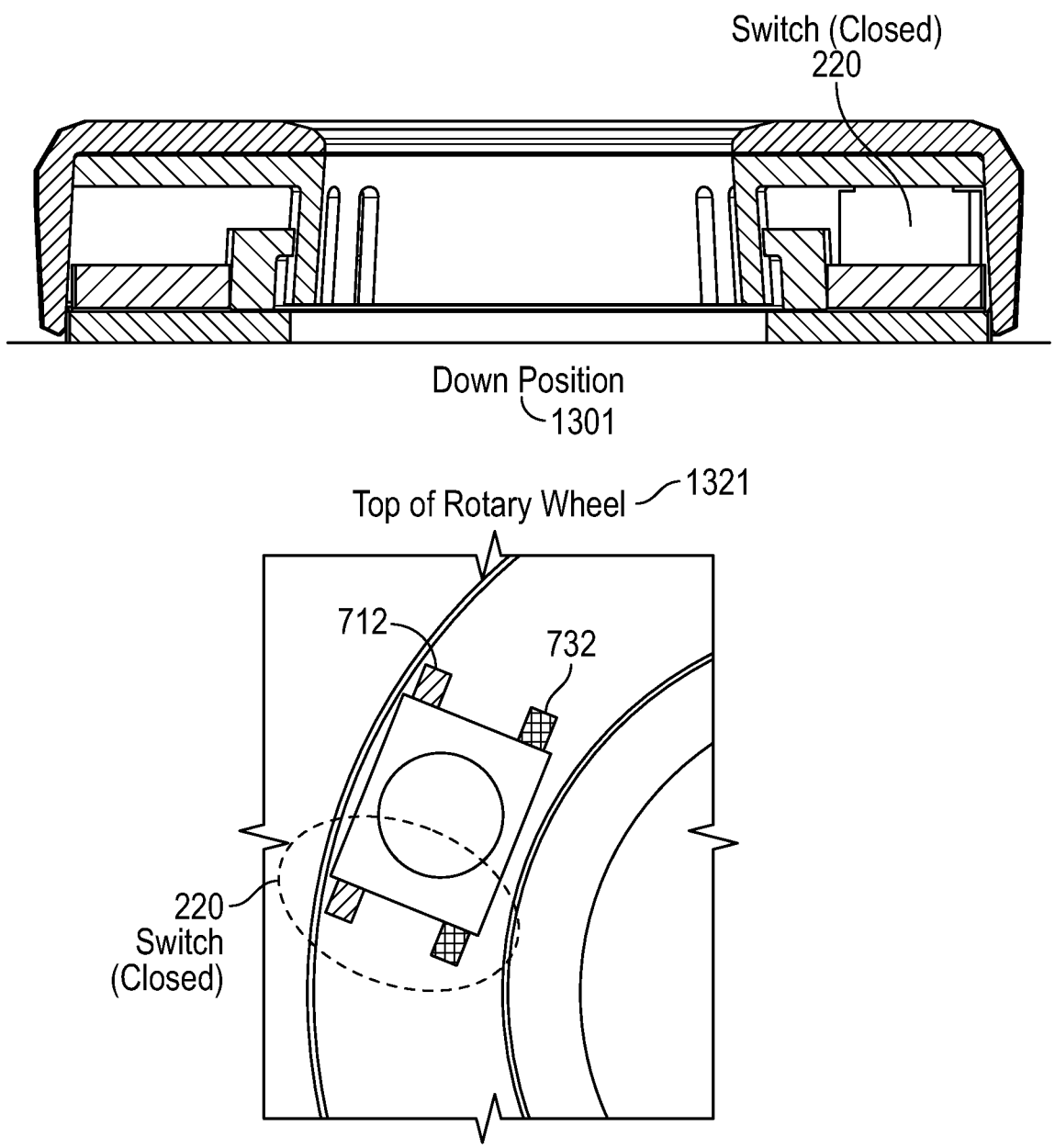
FIG. 13B illustrates a cut-away view illustrating the down position of the example rotatable knob interface of FIGS. 2 and 3, in which position the switch is closed, according to one or more embodiments.

Similarly, FIG. 13B illustrates a cut-away view illustrating the down position 1302 of the rotatable knob interface 150 of FIGS. 2 and 3, when the switches 220 are closed, as indicated in drawing 1321, according to one or more embodiments. In this case, again with reference to FIG. 13A, there is an electrical connection (e.g., a capacitive coupling) between the conducting ring 712 and the inner ring region 732 provided near the top surface of the rotary wheel (as described above with reference to FIG. 7B). Thus the corresponding conductive regions on the bottom of the rotary wheel 230, namely the conductive regions 710 (all of which are electrically connected to each other) and inner ring 730, as shown at drawing 1322, are electrically connected. Further, as shown at drawing 1323, inner conducting ring 232 is now electrically connected to peripheral ring 235 on the top of the fixed base 231, and, as a result, on the bottom of fixed base 231, as shown in drawing 1324, the coupling electrode 420 is electrically coupled to the set of electrodes 430. The set of electrodes 430 is coupled to one or more of the sensor electrodes 125 to receive the reference signal provided by the processing system 110. In one or more embodiments, when the switches 220 are closed, the conductive regions 710, in addition to being coupled to peripheral ring 235, are also partially coupled to the conductive pads 237 and 238 on the top of the fixed base 231. Thus, there may be a slight effect on the resulting signal corresponding to the inner ring 730 (via the coupling electrode 420) when the switches 220 are closed. This effect may not negatively affect the change in capacitive coupling determined by the processing system 110. For example, when the switches 220 are closed, there will be a slight drop in a resulting signal associated with rotation of the rotatable knob interface 150. Also, the sensor electrodes according to the coupling electrodes 410 and 411 may also see a slight drop in value the corresponding upper conductive pads 237 and 238 are both coupled to conductive regions 710 of the underside of the rotary wheel (as is shown in FIG. 11A, state 4 1140). This is because instead of having just two coupling electrodes 410 and 411 that are coupled to a ground signal (e.g., a reference signal), a third coupling electrode 420 is also coupled to the ground signal due to the switch 220 closing. Accordingly, a part of the ground signal provided by the sensor electrode of region 403 of the sensor electrodes 125, shown in FIG. 4B. Notwithstanding this small change in strength of the resulting signal, as noted above, in some embodiments, detection of rotation of the rotary wheel 230 fully operates even while the switches 220 are closed.

Figure 14:
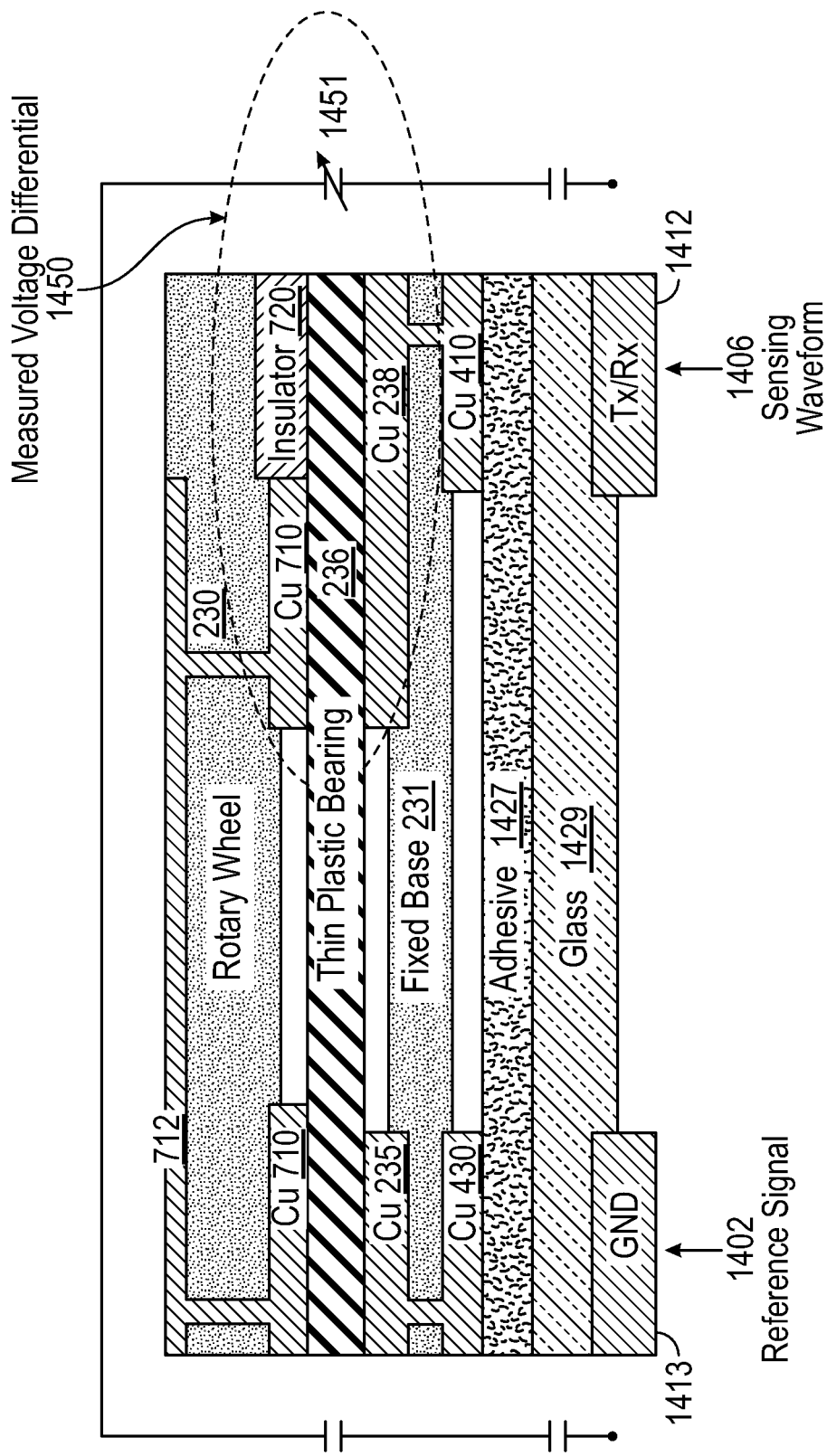
FIG. 14 depicts a schematic cross-section of an example rotatable knob interface, implemented on an input device having a sensing grid, according to one or more embodiments.

FIG. 14 depicts a schematic cross-section of an example rotatable knob interface (e.g., the rotatable knob interface 150), implemented on an example input device (e.g., the electronic device 100) having sensor electrodes (e.g., the sensor electrodes 125), according to one or more embodiments. With reference thereto, beginning at the bottom of FIG. 14, there is shown an upper portion of an example input device (e.g., electronic device 100), namely glass layer 1429 and two exemplary sensor electrodes 1412 and 1413 below the glass layer 1429. The sensor electrodes 1412 and 1413 are part of the sensor electrodes 125. For example, with reference to FIG. 4B, the sensor electrode 1413 is a sensor electrode of the sensor electrodes 125 within the region 403, and the sensor electrode 1412 is a sensor electrode of the sensor electrodes 124 within the region 402. It is noted that, for consistency, the same indexing numbers that were used in FIGS. 4A through 4C for analogous elements, are used here, where appropriate. In the depicted embodiment, glass layer 1429 may be the upper surface of an example input device (e.g., the electronic device 100). For example, the glass layer 1429 may be a lens or encapsulation layer of the display panel 120. As shown, sensor electrode 1413 is driven with a reference signal 1402, for example ground or another DC voltage, by the sensor driver 140 and sensor electrodes of the region 402 is driven with a sensing signal 1406 by the sensor driver 140 as described above.

Continuing with reference to FIG. 14, above glass layer 1429 there is provided an adhesive layer 1427, with which, in embodiments, a fixed base of the rotatable knob interface 150 may be secured to the glass layer 1429, and thus to the electronic device 100. From adhesive layer 1427 to the top of the figure are shown components of the rotatable knob interface 150. Thus, there is a fixed base 231 and a rotary wheel 230, both as described above, with a thin plastic horizontal bearing 236 provided between them. The fixed base 231 has a bottom surface and a top surface, as described above. The bottom surface is provided with coupling electrodes 410 and 430, where coupling electrode 430 couples to and receives a reference signal from the sensor electrode 1413 of the electronic device 100, and coupling electrode 410 couples to and receives a sensing signal from the sensor electrodes of the region 402 of the electronic device 100, as described above with reference to FIG. 4C, with the caveat that the cross sectional view of FIG. 14 does not include all of the coupling electrodes of the bottom surface of the fixed base 231. The top surface of the fixed base 231 includes the peripheral ring 235, which is connected, as shown, to the set of electrodes 430. The set of sensor electrodes 430 is coupled to the sensor electrode 1413 which may be driven with a reference signal. The top surface of the fixed base 231 also includes the conductive pad 238, which is electrically connected to the coupling electrode 410. One or more of the peripheral ring 235, the set of sensor electrode 430, the conductive pad 238, and the coupling electrode 410 may be formed from copper (Cu) or another conductive material. Each of the peripheral ring 235, the set of sensor electrode 430, the conductive pad 238, and the coupling electrode 410 may be formed from a common conductive material, or one or more different conductive materials. Further, as is illustrated in FIG. 14, the non-conductive region 720 may be formed from an insulator.

Continuing further with reference to FIG. 14, above the top surface of the fixed base 231 there is a thin horizontal plastic bearing 236, as shown. Further, the rotary wheel 230 is positioned above the thin horizontal plastic bearing 236. The rotary wheel 230, as shown, has a bottom surface. Both of the conductive regions 710 and non-conductive regions 720 are disposed on the bottom surface of the rotary wheel 230, as described above. In FIG. 14 the conductive regions 710 and non-conductive regions 720 are shown as being radially side by side for ease of illustration. However, as shown above in the example of FIG. 8, these two regions are actually provided side by side around the periphery of the rotary wheel 230, at the same radial distance from the center (e.g., one in front of the other in a dimension coming out of the page in FIG. 14). As also shown by the conducting ring (or connector) 712, all of the conductive regions 710 of the rotary wheel 230 are electrically interconnected, as described above with reference to FIG. 7B. As the rotary wheel 230 rotates, a circuit is electrically coupled (e.g., capacitively coupled) when one or more of the conductive regions 710 of the rotary wheel 230 at least partially overlaps the conductive pad 238. The circuit is electrically decoupled when one or more of the non-conductive regions 720 of the rotary wheel 230 overlaps the conductive pad 238 and the conductive pad 238 is not sufficiently electrically coupled to one or more conductive regions 710. Accordingly, a voltage differential 1450 between the rotary wheel 230 and the fixed base 231 is created and the voltage differential 1450 is measured by the determination module 141. For example, the sensor driver 140 receives one or more resulting signals from the sensor electrode 1406 (e.g., a sensor electrode 125 of the region 402 as illustrated in FIG. 4B), and the determination module 141 determines the measured voltage differential 1450 from the one or more resulting signals. Similarly, although not shown in the cross-section drawing of FIG. 14, a circuit is electrically coupled when the conductive pad 237 of is at least partially underneath, and thus at least partially electrically coupled to one or more of the conductive regions 710. The circuit is electrically decoupled when one of the non-conductive regions 720 of the rotary wheel 230 overlaps conductive pad 237 and the conductive pad 237 is not sufficiently electrically coupled to one or more conductive regions 710.

As shown in FIG. 14, the change in electrical coupling of the conductive pad 238 from the non-conductive region 720 to the conductive region 710, via rotation of the rotary wheel 230, changes the capacitance 1451. The capacitance 1451 may be determined by measuring the voltage differential 1450. This measurement is used to detect the relative rotational position of the rotary wheel 230 with respect to the fixed base 231, as described above.

Figures 15A, 15B:
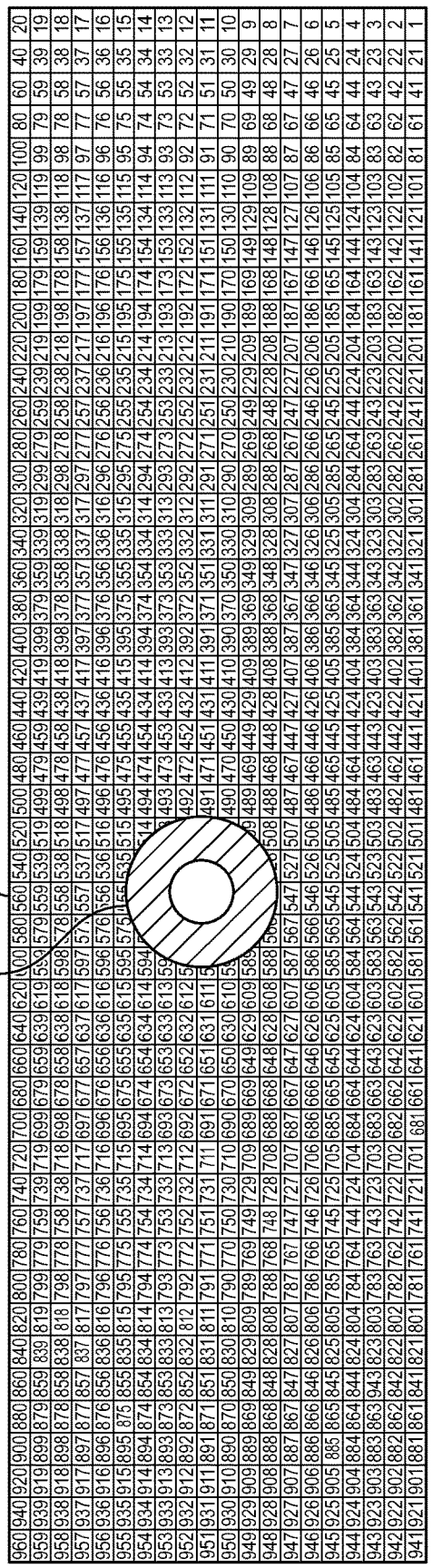
FIG. 15A illustrates a first example placement of a rotatable knob interface above an example sensor grid, according to one or more embodiments.
FIG. 15B illustrates a second example placement of a rotatable knob interface above a sensor grid, according to one or more embodiments.

FIGS. 15A, 15B, 15C, 15D, and 16 illustrate exemplary positioning of the rotatable knob interface 150 on a display panel (e.g., the display panel 120) of an input device (e.g., electronic device 100). FIG. 15A illustrates a first example placement of a rotatable knob interface 150 as centered above an example sensor grid (e.g., a sensor grid of the sensor electrodes 125 of FIG. 1), according to one or more embodiments. As shown, the example sensor grid includes several sensor arrays, in this example there are eight sensor arrays (slices), each comprising six columns of twenty sensor electrodes each. In one embodiment, more or less than eight sensor arrays may be utilized. Further, the sensor arrays may comprise more or less than six columns and/or each column may comprise more or less than twenty sensor electrodes. Throughout the following, sensor array and slice may be used interchangeable. The rotatable knob interface 150 may be centered on one of the eight depicted sensor arrays. For example, in the embodiment of FIG. 15A, the rotatable knob interface 150 is centered on the fourth sensor array from the left. In this example placement, the coupling electrodes (e.g., the set of electrodes 430 of FIG. 4A) on the bottom surface of the fixed base that receive a reference signal, for example a ground signal, have maximum area as compared to other placements of the rotatable knob interface 150. This is because, in a sensor grid of the type shown in FIGS. 15A through 15C, the sensor electrodes are separated into different slices 1501. In this example, each slice 1501 has six columns of sensor electrodes (e.g., touch pixels), and there a total of 8 slices shown. In one or more embodiments, only one slice 1501 (also sometimes known as a "mux") out of the eight slices may be operated for capacitive sensing by the sensor driver 140 at one time. Therefore, in order to sense the rotatable knob interface 150 in one-time instance, the rotatable knob interface 150 is located entirely in one slice, as shown. Accordingly, in various embodiments, the rotatable knob interface 150 may not be centered on the sensor gird as a whole, but rather only centered within a single six column slice 1501. In other placements, perhaps which may be more visually symmetric as compared to an embodiment where the rotatable knob interface 150 is not centered on the sensor grid, the number of coupling electrodes receiving a reference signal (e.g., ground) is less. Such an embodiment is next described with regard to FIG. 15B. Further, in other embodiments, as will be described later, the rotatable knob interface 150 spans and is electrically coupled to the sensor electrodes of more than one slice of the sensor grid.

FIG. 15B illustrates a second example placement of the rotatable knob interface 150 above a sensor grid, according to one or more embodiments. Here the rotatable knob interface 150 is centered on the display panel as a whole, which may be visually more symmetric. In such an embodiment, the rotatable knob interface 150 straddles two of the eight slices 1501, e.g., slices 1501a, 1501b. As only one of the eight slices may be operated for capacitive sensing by the sensor driver 140 at a time, the area of the electrodes on the bottom surface of the fixed base that receive a reference signal (e.g., the set of electrodes 430 of FIG. 4A) is smaller than that of the embodiment of FIG. 15A. For example, in one embodiment, the area is reduced on the order of about one quarter of the area for the placement case of FIG. 15A. In order to place the rotatable knob interface 150 in the center of the screen (e.g., center of the display panel 120), as some users may prefer, only half of the rotatable knob interface 150 may have conductive pads. That half would thus be placed in the desired slice (e.g., the slice 1501a or the slice 1501b) and the corresponding sensor electrodes would be utilized to sense the rotation of the rotatable knob interface 150. Because of the reduction in conductive area for the reference voltage (e.g., ground signal) due to the limited space, the rotatable knob interface 150 may have a reduced signal as compared to the embodiment of FIG. 15A.

Figure 15C:
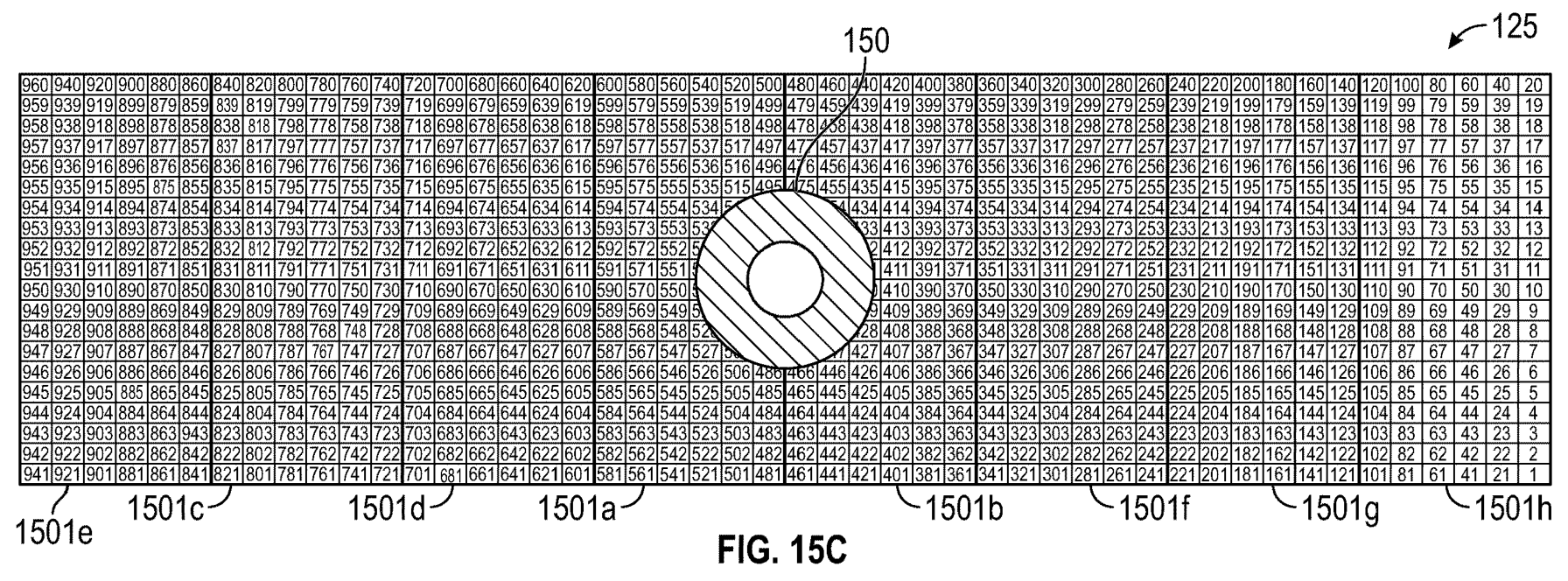

In the embodiment of FIG. 15C, the rotatable knob interface 150 is positioned over slices 1501a and 1501b. Alternatively, the rotatable knob interface 150 may be positioned over any two of the slices 1501c-h. As will be described in further detail in the following, the sensor electrodes of the slice 1501a are driven with sensing signals by the sensor driver 140 and the sensor electrodes of the slice 1501b are driven with a reference signal (e.g., a ground signal or other DC voltage signal). The coupling electrodes 410, 411, and 420 are positioned over the sensor electrodes 125 of the slice 1501a and the set of electrodes 430 is positioned over the sensor electrodes 125 of the slice 1501b. The coupling electrodes 410, 411, and 420 are electrically coupled (e.g., capacitively coupled) to a respective one or more sensor electrodes of the slice 1501a. Accordingly, as will be described in further detail below, when the sensor electrodes of the slice 1501a are driven with a sensing signal by the sensor driver 140 to operate the sensor electrodes of the slice 1501a for capacitive sensing, the coupling electrodes 410, 411, and 420 are driven with the sensing signal via the corresponding electrical couplings. Further, the set of electrodes 430 is electrically coupled to one or more of the sensor electrodes of the slice 1501b. Accordingly, when the sensor electrodes of the slice 1501b are driven with the reference signal, the set of electrodes 430 is driven with the reference signal via the corresponding electrical coupling or couplings.

As compared to the embodiment of FIG. 15B, in an embodiment of FIG. 15C, the conductive area of the rotatable knob interface 150 is increased, and the changes in the electrical coupling generated by rotating the rotatable knob interface 150 are increased.

As illustrated in FIG. 15C, the sensor electrodes 125 are disposed in a matrix of rows and columns. Each of the slices 1501a-1501h includes one or more columns of the sensor electrodes 125. In one embodiment, each of the slices 1501a-1501h includes two or more columns of the sensor electrodes 125. Further, each of the slices 1501a-1501h includes the same number columns of the sensor electrodes 125. In one embodiment, a first one or more of the slices 1501a-1501h includes a different number of columns than a second one or more of the slices 1501a-1501h. The number of sensor electrodes 125 may be the same between the slices 1501a-1501h or differ between at least two of the slices 1501a-1501h.

Figure 15D:
FIG. 15D illustrates a fourth example placement of a rotatable knob interface above a sensor grid, according to one or more embodiments.
Figure 16:
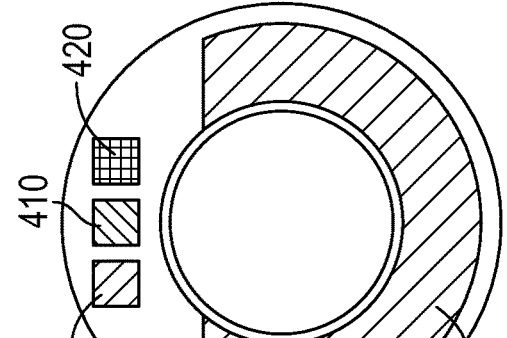
FIG. 16 illustrates placement of a rotatable knob interface of FIG. 15D, where the interface partially overlaps with the grid of sensor electrodes, according to one or more embodiments.

FIG. 15D illustrates a third example placement of a rotatable knob interface 150, where the interface is provided only partially above the sensor grid (e.g., the sensor electrodes 125), according to one or more embodiments. In this example embodiment, in order to provide sufficient ground (e.g., reference voltage) connections, as shown, an external metal grounding 1610 is used. As shown in FIG. 16, a lower portion 1620 of the rotatable knob interface 150, including the set of electrodes 430, is electrically coupled with the external metal grounding 1610 of FIG. 15D. As further shown in FIG. 16, in this example placement embodiment, the coupling electrodes 410, 411, and 420, which are coupled to the sensor electrodes (e.g., the sensor electrodes 125) of the input device (e.g., the electronic device 100) that are driven with a sensing signal, are provided above the edge of the rotatable knob interface 150, as the sensing signal can only come from sensor electrodes (e.g., the sensor electrodes 125) of the sensor grid. This example placement minimizes visual occlusion of the display panel 120.

Figure 17:
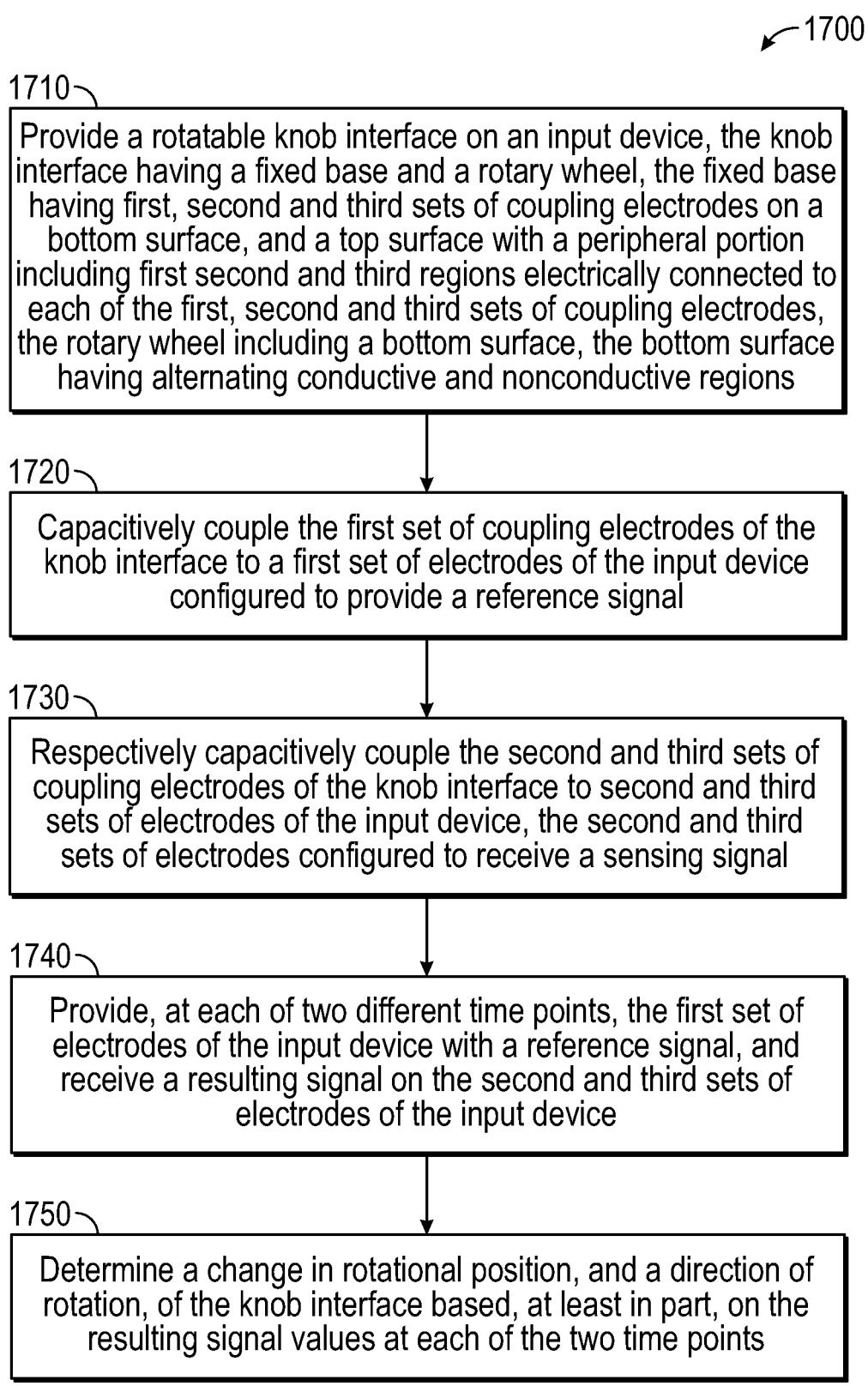
FIG. 17 illustrates an example method for implementing a rotatable knob interface on an example input device, according to one or more embodiments.

FIG. 17 is a process flow chart illustrating a method 1700 for implementing a rotatable knob interface on an example electronic device, and determining a position and/or state of the rotatable knob interface according to one or more embodiments. For example, the electronic device may be a combined display and sensing device, such as one that, for example, includes TDDI technology, as described above.

Method 1700 includes blocks 1710 through 1750. In alternate embodiments, method 1700 may have more, or fewer, blocks. Method 1700 begins at block 1710, where a rotatable knob interface 150 is provided on an input device (e.g., the electronic device 100), the rotatable knob interface having a fixed base and a rotary wheel, the fixed base having first, second and third sets of coupling electrodes on a bottom surface, and a top surface with a peripheral portion including first second and third regions electrically connected to each of the first, second and third sets of coupling electrodes. The rotary wheel has a bottom surface provided with alternating conductive and non-conductive regions. For example, the rotatable knob interface may be any of those illustrated in FIGS. 1 through 14, and described above.

From block 1710, method 1700 proceeds to block 1720, where the first set of coupling electrodes of the knob interface is capacitively coupled to a first set of electrodes of the input device configured to provide a reference signal. For example, the first set of electrodes may be the set of electrodes 430 of FIG. 4A. In one embodiment, the set of first electrodes may include a single electrode. The reference signal, for example, may be a ground signal generated by processing circuitry of the electronic device, such as, for example, the circuitry of the processing system 110 of the electronic device 100 of FIG. 1. As another example, the reference signal may be a ground signal output by a TDDI device from an arbitrarily chosen analog front end. In another embodiment, the reference signal is a DC voltage other than a ground signal.

From block 1720, method 1700 proceeds to block 1730, where the second and third sets of coupling electrodes of the knob interface are capacitively coupled to second and third sets of electrodes of the input device, the second and third sets of electrodes are configured to receive a sensing signal. For example, the second and third sets of coupling electrodes may be the coupling electrodes 410 and 411 of FIG. 4A, which may be coupled to respective ones of the sensor electrodes 125 within the region 402 of FIG. 4B. The same sensing signal may be provided to all of the sensor electrodes 125 within the region 402 of FIG. 4B, and thus the second and third sets of coupling electrodes may be coupled to the same signal.

From block 1730, method 1700 proceeds to block 1740, where, at each of two different time points, the first set of electrodes of the input device is provided with a reference signal, and a resulting signal is then received on the second and third sets of electrodes of the input device. As noted above, the resulting signal has been modified by the relative rotational positions of the fixed base and rotary wheel of the rotatable knob interface, as described above, for example, with reference to FIGS. 10, 11A and 11B. As noted, the second and third set of electrodes of the input device may be driven with the same sensing signal.

From block 1740, method 1700 proceeds to block 1750, where, based at least in part on the data obtained at each of the two different time points, a change in rotational position and a direction of rotation of the knob interface is determined. In one or more embodiments, this determination may be performed by firmware stored in a memory of the input device. Method 1700 terminates at block 1750.

Figure 18:
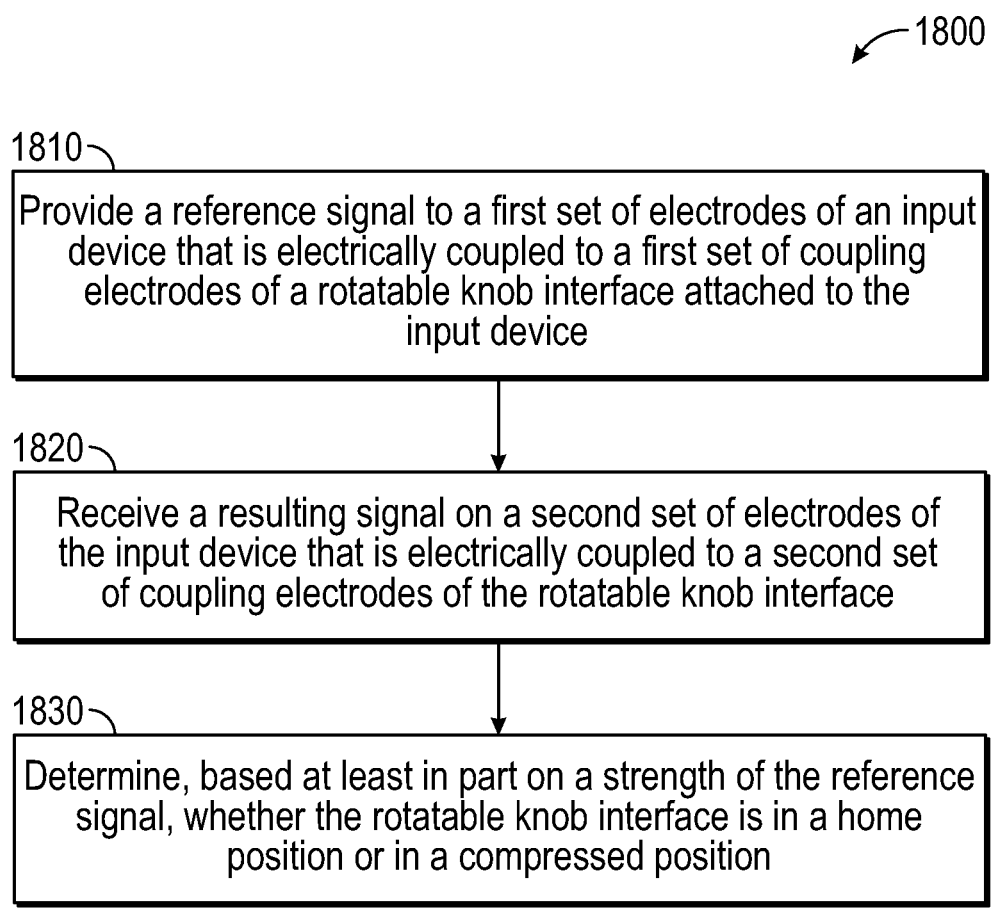
FIG. 18 illustrates an example method for processing signals from an input device having a rotational interface, according to one or more embodiments.

FIG. 18 is a process flow chart illustrating a method 1800 for processing signals from an example combined display and sensing device ("input device") having a rotatable knob interface attached to it, where the knob interface is additionally provided with "click" sensing apparatus, such as, for example, the switches illustrated in FIGS. 2, 3, 12 and 13, and described above, in accordance with various embodiments. Thus, the example rotatable knob interface has a home, or "uncompressed" state, as well as a "compressed" state. In other embodiments, the example rotatable knob interface may have more than two states and include one or more partially compressed states. For example, the electronic device may include TDDI technology, as described above, and the rotatable knob interface may be any of the rotatable knobs illustrated in FIGS. 1-14, described above.

Method 1800 includes blocks 1810 through 1830. In alternate embodiments, method 1800 may have more, or fewer, blocks. Method 1800 begins at block 1810, where a reference signal is provided to a first set of electrodes of an input device that is electrically coupled to a first set of coupling electrodes of a rotatable knob interface that is attached to the input device. For example, the first set of electrodes may be electrodes may be electrodes 430 of FIG. 4A, and, for example, the reference signal may be a ground signal of the input device, or, for example, another DC signal generated by processing circuitry of the input device.

From block 1810, method 1800 proceeds to block 1820, where a resulting signal is received on a second set of electrodes of the input device that is electrically coupled to a second set of coupling electrodes of the rotatable knob interface. The resulting signal is modified by the rotatable knob interface. For example, the second set of electrodes may be the coupling electrode 420 of FIG. 4A, and it may be coupled to one of sensor electrodes of the region 402 of FIG. 4B.

From block 1820, method 1800 proceeds to block 1830, where it may be determined, based at least in part on a strength of the reference signal provided to the first electrode of the input device, whether the rotatable knob interface is in a home position, where the switches are open, such as is shown in FIG. 13A, or whether it is in a closed position, where the switches are closed, as shown in FIG. 13B. As noted above, when in the home, or open position, there is no connection, because the switches 220 is open, and inner ring 730 of the bottom surface of the rotary wheel is floating. On the other hand, when the rotatable knob interface is in a compressed position, such as is shown in FIG. 13B, then there is an electrical connection, due to the switches 220 now being closed, and inner ring 730 of the bottom surface of the rotary wheel is electrically connected to the conductive regions 710 of the rotary wheel. In a partially compressed position, an electrical connection is formed between the inner ring 730 and the conductive regions 710, however, the electrical connection formed is smaller (e.g., causes a smaller change to the resulting signal) than the electrical connection formed in the compressed state. Method 1800 then terminates at block 1830.

Figure 19:
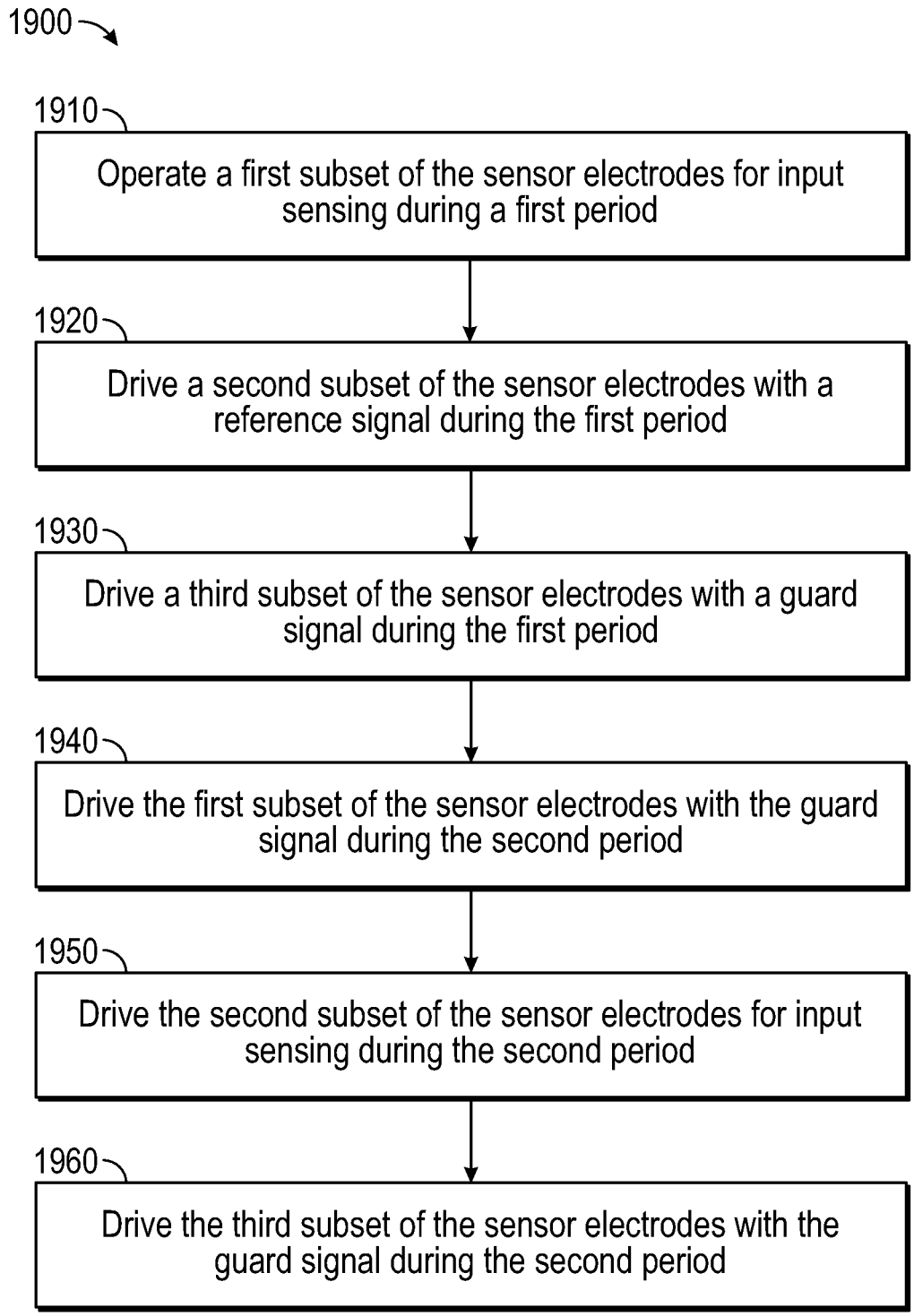
FIG. 19 illustrates an example method for operating an input device having a rotational interface, according to one or more embodiments.

FIG. 19 illustrates a flow diagram of the method 1900 for operating an electronic system (e.g., the electronic device 100), according to one or more embodiments. The method starts at block 1910 where first subset of the sensor electrodes 125 are operated for input sensing during a first period. For example, with reference to FIGS. 1 and 15C, a subset of the sensor electrodes 125 corresponding to the slice 1501a is operated for input sensing (e.g., capacitive sensing) by the sensor driver 140. During the first period, the sensor driver 140 drives (e.g., modulates) the subset of the sensor electrodes 125 corresponding to the slice 1501a with a sensing signal and receives resulting signals from the driven sensor electrodes. The sensor driver 140 may simultaneously drive two or more of the subset of the sensor electrodes 125 corresponding to the slice 1501a with the sensing signal while receiving resulting signals from the driven two or more of the subset of the sensor electrodes corresponding to the slice 1501a.

From block 1910, the method 1900 proceeds to block 1920. At block 1920, a second subset of the sensor electrodes 125 is driven with a reference signal (e.g., a ground signal) during the first period. For example, with reference to FIGS. 1 and 15C, the sensor driver 140 drives a subset of the sensor electrodes 125 corresponding to the slice 1501b with a reference signal. The sensor driver 140 simultaneously drives two or more of the sensor electrodes of the subset of the sensor electrodes 125 corresponding to the slice 1501b with the reference signal during the first period. In other embodiments, the subset of the sensor electrodes 125 corresponding to the slice 1501b is driven with a reference signal via voltage driver external to the sensor driver 140. The voltage driver may be part of the processing system 110. The voltage driver may be part of a driver configured to update the display panel 120.

From block 1920, the method 1900 proceeds to block 1930. At block 1930, a third subset of the sensor electrodes 125 is driven with a guard signal during the first period. The guard signal and the sensing signal have a frequency, phase, and/or amplitude in common. For example, with reference to FIGS. 1 and 15C, the sensor driver 140 drives a subset of the sensor electrodes 125 corresponding to the slice 1501c with the guard signal. Two or more of the sensor electrodes of the subset of the sensor electrodes 125 corresponding to the slice 1501c are simultaneously driven with the guard signal. Further, during the first period, the sensor driver 140 drives one or more the subset of the sensor electrodes 125 corresponding to the slices 1501d-1501h with the guard signal.

During the first period, driving the first subset of the sensor electrodes 125 with the sensor signal, driving the second subset of the sensor electrodes 125 the reference signal, and driving the third subset of the sensor electrodes 125 with the guarding signal at least partially overlap each other. Driving the first subset of the sensor electrodes 125 with the sensor signal, driving the second subset of the sensor electrodes 125 the reference signal, and driving the third subset of the sensor electrodes 125 with the guarding signal completely may overlap each other.

With further reference to FIGS. 4C and 15C, the coupling electrodes 410, 411, and 420 of the rotatable knob interface 150 are placed over and electrically coupled (e.g., capacitively coupled) to respective sensor electrodes of the subset of the sensor electrodes 125 corresponding to the slice 1501a. For example, the coupling electrode 410 is placed over and electrically coupled to a first one or more sensor electrodes of the slice 1501a, the coupling electrode 411 is placed over and electrically coupled to a second one or more of the sensor electrodes of the slice 1501a, and the coupling electrode 420 is placed over and electrically coupled to a third one or more of the sensor electrodes of the slice 1501a. Accordingly, during the first period, each of the coupling electrodes 410, 411, and 420 receive the sensing signal from the respective one or more sensor electrodes of the slice 1501a via the respective electrical coupling.

The set of electrodes 430 of the rotatable interface are placed over one or more of the sensor electrodes of the subset of the sensor electrodes 125 corresponding to the slice 1501b. The set of electrodes 430 are electrically coupled to the one or more of the sensor electrodes of the subset of the sensor electrodes 125 corresponding to the slice 1501b. Accordingly, during the first period, the set of electrodes 430 receives the reference signal from the one or more sensor electrodes of the subset of the sensor electrodes 125 corresponding to the slice 1501b. Accordingly, the rotatable knob interface 150 is detected as being positioned over the slice 1501a and the slice 1501b.

As described above, the set of electrodes 430 is electrically coupled with the conductive regions 710. During the first period, as the rotatable knob interface 150 is rotated, the position of the conductive regions 710 and the non-conductive regions 711 relative to the coupling electrodes 410 and 411 changes, altering the resulting signals received from the sensor electrode or electrodes electrically coupled with the coupling electrodes 410 and 411.

The determination module 141 receives resulting signals from the sensor electrodes 125 coupled to the coupling electrodes 410 and 411. Further, the determination module 141 determines the amount of rotation and/or the direction of rotation of the rotatable knob interface 150 from the resulting signals. For example, the determination module 141 determines measurements of the changes in the capacitive couplings of the sensor electrodes 125 coupled to the coupling electrodes 410 and 411 from the resulting signals. The determination module 141 determines the amount of rotation and/or the direction of the rotation based on the measurements of the changes in the capacitive couplings of the sensor electrodes 125 coupled to the coupling electrodes 410 and 411.

To detect input objects 145 external to the rotatable knob interface 150, resulting signals may be received from one or more of the sensor electrodes of the subset of the sensor electrodes 125 of the slice 1501a not electrically coupled to the coupling electrodes 410, 411, or 420. These resulting signals are processed by the determination module 141 to determine measurements of changes in capacitive couplings for the respective sensor electrodes. The changes in capacitive coupling for these sensor electrodes correspond to a change in capacitive coupling between the sensor electrodes and the input object 145. The changes in capacitive coupling may be changes in absolute capacitance. Further, the determination module 141 determines positional information for the input object 145 based on the measurements of the changes in capacitive couplings.

Further, during the first period, a fourth subset of the sensor electrodes 125 is driven with the reference signal. For example, the sensor driver 140 drives the subset of the sensor electrodes 125 corresponding to the slice 1501d with the reference signal during the first period. As is illustrated by FIG. 15B, the slice 1501d is positioned between the slice 1501*c* and 1501*a*. Additionally, or alternatively, during the first period, the subsets of the sensor electrodes 125 corresponding to slices 1501*e*, 1501*f*, 1501*g*, and/or 1501*h* are driven with the reference signal by the sensor driver 140 during the first period. Further, during the first period, one or more of the subsets of the sensor electrodes 125 corresponding to the slices 1501*d*-1501*h* are driven with the guard signal.

From block 1930, the method 1900 proceeds to block 1940. At block 1940, the first subset of the sensor electrodes 125 is driven with the guard signal during a second period. For example, the sensor driver 140 drives the set of the sensor electrodes 125 corresponding to the slice 1501*a* with the guard signal during the second period. The second period is non-overlapping with the first period. The second period may occur after the first period. Further, the second period is subsequent to the first period.

From block 1940, the method 1900 proceeds to block 1950. At block 1950, the second subset of the sensor electrodes 125 is operated for input sensing during the second period. For example, during the second period, the sensor driver 140 drives the subset of the sensor electrodes 125 corresponding to the slice 1501*b* with a sensing signal and receives resulting signals from the driven sensor electrodes.

The resulting signals are communicated to the determination module 141 and the determination module 141 processes the resulting signals to determine measurements of changes in the capacitive couplings of the sensor electrodes of the subset of the sensor electrodes 125 corresponding to the slice 1501*b*. For example, the determination module 141 determines a measurement of a change in capacitive coupling for each of the sensor electrodes of the subset of sensor electrodes 125 corresponding to the slice 1501*b*. The changes in capacitive coupling for each of the sensor electrodes of the subset of sensor electrodes 125 corresponding to the slice 1501*b* correspond to a change in capacitive coupling between the sensor electrodes 125 and the input object 145. The changes in capacitive coupling for each of the sensor electrodes of the subset of sensor electrodes 125 corresponding to the slice 1501*b* may be changes in absolute capacitance.

The determination module 141 determines positional information for the input object 145 based on the measurements of changes in the capacitive couplings. The determination module 141 may determine a two-dimensional image from the measurements of changes in the capacitive couplings. The determination module 141 may determine the two-dimensional image based on the measurements of changes in the capacitive couplings according to the sensor electrodes of two or more slices 1501.

From block 1950, the method 1900 proceeds to block 1960. At block 1960, the third subset of the sensor electrodes is driven with the guard signal during the second period. For example, the sensor driver 140 drives the set of the sensor electrodes 125 corresponding to the slice 1501*c* with the guard signal during the second period.

The sensor driver 140 is further configured to drive the subsets of the sensor electrodes 125 corresponding to the slices 1501*a* and 1501*b* with the guard signal during a third period. The third period is non-overlapping with the second period and the first period. The third period may occur after the second period. Further, the third period is subsequent to the second period. Further, during the third period, the sensor driver 140 drives the subset of the sensor electrodes 125 corresponding to the slice 1501*c* with a sensing signal and receives resulting signals from the driven sensor electrodes. As is discussed above, the determination module 141 processes the resulting signals to determine changes in capacitive coupling of the sensor electrodes of the subset of the sensor electrodes 125 corresponding to the slice 1501*c*. Further, the determination module 141 determines positional information for the input object 145 based on the changes in the capacitive couplings of the sensor electrodes of the subset of the sensor electrodes 125 corresponding to the slice 1501*c*.

During a fourth period, the sensor driver 140 drives the subset of the sensor electrodes 125 corresponding to the slice 1501*e* with a sensing signal while receiving resulting signals from the drive sensor electrodes. Further, during the fourth period, the sensor driver 140 drives the slices 1501*a*-1501*d*, and 1501*f*-1501*h* with the guard signal.

During a fifth period, the sensor driver 140 drives the subset of the sensor electrodes 125 corresponding to the slice 1501*f* with a sensing signal while receiving resulting signals from the driven sensor electrodes. Further, during the fifth period, the sensor driver 140 drives the slices 1501*a*-1501*e*, and 1501*g*-1501*h* with the guard signal.

During a sixth period, the sensor driver 140 drives the subset of the sensor electrodes 125 corresponding to the slice 1501*g* with a sensing signal while receiving resulting signals from the drive sensor electrodes. Further, during the sixth period, the sensor driver 140 drives the slices 1501*a*-1501*f*, and 1501*h* with the guard signal.

During a seventh period, the sensor driver 140 drives the subset of the sensor electrodes 125 corresponding to the slice 1501*h* with a sensing signal while receiving resulting signals from the drive sensor electrodes. Further, during the seventh period, the sensor driver 140 drives the slices 1501*a*-1501*g* with the guard signal.

The determination module 141 determines measurements of the changes in the capacitive couplings from the resulting signals received from the sensor electrodes 125 driven with sensing signals during the fourth through seventh periods. Further, the determination module determines positional information for the input object 145 based on the measurements of the changes in the capacitive couplings. The determination module 141 may determine a two-dimensional image from the measurements of the changes in the capacitive couplings. Further, the determination module 141 determines the positional information based on the two-dimensional image.

The first through seventh periods correspond to different periods of a first capacitive sensing frame. During the first capacitive frame, each of the sensor electrodes 125 is operated for input sensing (e.g., driven with a sensing signal). The first capacitive frame is one of a plurality of capacitive frames. During each capacitive frame, each of the sensor electrodes 125 is operated for input sensing. The capacitive frames occur at a capacitive frame rate. For example, the capacitive frame rate may be 30 Hz, 60 Hz, 120 Hz, 240 Hz, among others. The capacitive frame rate may be variable or fixed. The capacitive frame rate is the same as or differs from the display frame rate. The capacitive frame rate may be a multiple of the display frame rate. In other embodiments, the capacitive frame rate is a fraction of the display frame rate.

The first through seventh periods described with regard to FIG. 19 correspond to input sensing periods as is described above. For example, the first through seventh periods described with regard to FIG. 19 may occur during non-display update periods. Alternatively, the first through seventh periods described with regard to FIG. 19 may at least partially overlap with display update periods. Each of the first through seventh periods may occur during a corresponding one or more non-display update periods of a common display frame.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A sensing system comprising:
   sensor electrodes;
   a processing system coupled to the sensor electrodes and configured to:
      operate, during a first period, a first subset of the sensor electrodes for input sensing by driving the first subset of the sensor electrodes with a sensing signal and receiving resulting signals from the first subset of the sensor electrodes;
      drive, during the first period, a second subset of the sensor electrodes with a reference signal; and
      drive, during the first period, a third subset of the sensor electrodes with a guard signal, wherein the second subset of the sensor electrodes is between the first subset of the sensor electrodes and the third subset of the sensor electrodes; and
   a rotatable electronic device disposed over the sensor electrodes, the rotatable electronic device comprising:
      a first coupling electrode;
      a second coupling electrode configured to couple with and receive the reference signal from the second subset of the sensor electrodes; and
      a conductive region configured to be rotated relative to the first coupling electrode and the second coupling electrode, wherein the resulting signals are affected based on a position of the conductive region relative to the first coupling electrode when the first coupling electrode is coupled with the first subset of the sensor electrodes.

2. The sensing system of claim 1, wherein the processing system is further configured to:
   drive, during a second period, the first subset of the sensor electrodes with the guard signal;
   operate, during the second period, the second subset of the sensor electrodes for input sensing; and
   drive, during the second period, the third subset of the sensor electrodes with the guard signal, wherein the first period and the second period are non-overlapping.

3. The sensing system of claim 2, wherein the processing system is further configured to:
   drive, during a third period, the first subset of the sensor electrodes with the guard signal;
   drive, during the third period, the second subset of the sensor electrodes with the guard signal; and
   operate, during the third period, the third subset of the sensor electrodes for input sensing, wherein the second period and the third period are non-overlapping.

4. The sensing system of claim 1, wherein the processing system is further configured to:
   drive, during the first period, a fourth subset of the sensor electrodes with the reference signal, wherein the fourth subset of the sensor electrodes is disposed between the first subset of the sensor electrodes and the third subset of the sensor electrodes.

5. The sensing system of claim 1, wherein:
   the first coupling electrode is aligned over and configured to couple with a first sensor electrode of the first subset of the sensor electrodes; and
   the second coupling electrode is aligned over and configured to couple with a second sensor electrode of the second subset of the sensor electrodes.

6. The sensing system of claim 1 further comprising a display panel having the rotatable electronic device attached thereto.

7. The sensing system of claim 6, wherein the processing system is further configured to update a display of the display panel during a display update period, and wherein the first period corresponds to a non-display update period during which the display of the display panel is not updated.

8. The sensing system of claim 1, wherein the sensor electrodes are disposed in a matrix of rows and columns, and wherein the first subset of the sensor electrodes comprises a first two or more of the columns, the second subset of the sensor electrodes comprises a second two or more of the columns, and the third subset of the sensor electrodes comprises a third two or more of the columns.

9. A processing system comprising:
   a sensor driver configured to:
      operate, during a first period, a first subset of sensor electrodes for input sensing by driving the first subset of the sensor electrodes with a sensing signal and receiving resulting signals from the first subset of the sensor electrodes;
      drive, during the first period, a second subset of the sensor electrodes with a reference signal; and
      drive, during the first period, a third subset of the sensor electrodes with a guard signal, wherein the second subset of the sensor electrodes is between the first subset of the sensor electrodes and the third subset of the sensor electrodes;
      wherein the resulting signals comprise effects corresponding to a position of a conductive region of a rotatable electronic device relative to a first coupling electrode and a second coupling electrode of the rotatable electronic device when the first coupling electrode is coupled with the first subset of sensor electrodes and the second coupling electrode is coupled with the second subset of the sensor electrodes.

10. The processing system of claim 9, wherein the sensor driver is further configured to:
    drive, during a second period, the first subset of the sensor electrodes with the guard signal;
    operate, during the second period, the second subset of the sensor electrodes for input sensing; and
    drive, during the second period, the third subset of the sensor electrodes with the guard signal, wherein the first period and the second period are non-overlapping.

11. The processing system of claim 10, wherein the sensor driver is further configured to:
    drive, during a third period, the first subset of the sensor electrodes with the guard signal;
    drive, during the third period, the second subset of the sensor electrodes with the guard signal; and
    operate, during the third period, the third subset of the sensor electrodes for input sensing, wherein the second period and the third period are non-overlapping.

12. The processing system of claim 9, wherein the sensor driver is further configured to:
drive, during the first period, a fourth subset of the sensor electrodes with the reference signal, wherein the fourth subset of the sensor electrodes is disposed between the first subset of the sensor electrodes and the third subset of the sensor electrodes.

13. The processing system of claim 9 further comprising a display driver configured to update a display of a display panel, and wherein the rotatable electronic device is attached to the display panel.

14. The processing system of claim 13, wherein the processing system is further configured to update the display panel during a display update period, and wherein the first period corresponds to a non-display update period during which the display panel is not updated.

15. The processing system of claim 9, wherein the sensor electrodes are disposed in a matrix of rows and columns, and wherein the first subset of the sensor electrodes comprises a first two or more of the columns, the second subset of the sensor electrodes comprises a second two or more of the columns, and the third subset of the sensor electrodes comprises a third two or more of the columns.

16. A method for operating sensor electrodes, the method comprising:
operating, during a first period, a first subset of sensor electrodes for input sensing by driving the first subset of the sensor electrodes with a sensing signal and receiving resulting signals from the first subset of the sensor electrodes;
driving, during the first period, a second subset of the sensor electrodes with a reference signal; and
driving, during the first period, a third subset of the sensor electrodes with a guard signal, wherein the second subset of the sensor electrodes is between the first subset of the sensor electrodes and the third subset of the sensor electrodes,
wherein the first subset of the sensor electrodes is coupled with a first coupling electrode of a rotatable electronic device and the second subset of the sensor electrodes is coupled with a second coupling electrode of the rotatable electronic device, and wherein the resulting signals comprise effects corresponding to a position of a conductive region configured of the rotatable electronic device relative to the first coupling electrode and the second coupling electrode.

17. The method of claim 16 further comprising:
driving, during a second period, the first subset of the sensor electrodes with the guard signal;
operating, during the second period, the second subset of the sensor electrodes for input sensing; and
driving, during the second period, the third subset of the sensor electrodes with the guard signal, wherein the first period and the second period are non-overlapping.

18. The method of claim 17 further comprising:
driving, during a third period, the first subset of the sensor electrodes with the guard signal;
driving, during the third period, the second subset of the sensor electrodes with the guard signal; and
operating, during the third period, the third subset of the sensor electrodes for input sensing, wherein the second period and the third period are non-overlapping.

19. The method of claim 18 comprising updating a display of a display panel during a display update period, wherein the first period corresponds to a non-display update period during which the display panel is not updated, and wherein the rotatable electronic device is attached to the display panel.

20. The method of claim 16, wherein the sensor electrodes are disposed in a matrix of rows and columns, and wherein the first subset of the sensor electrodes comprises a first two or more of the columns, the second subset of the sensor electrodes comprises a second two or more of the columns, and the third subset of the sensor electrodes comprises a third two or more of the columns.

* * * * *